(12) United States Patent
Akiyama

(10) Patent No.: US 9,239,475 B2
(45) Date of Patent: Jan. 19, 2016

(54) OPTICAL SEMICONDUCTOR ELEMENT HAVING RING MODULATORS

(75) Inventor: Tomoyuki Akiyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 469 days.

(21) Appl. No.: 13/562,505

(22) Filed: Jul. 31, 2012

(65) Prior Publication Data

US 2013/0044973 A1 Feb. 21, 2013

(30) Foreign Application Priority Data

Aug. 17, 2011 (JP) .................................. 2011-178303

(51) Int. Cl.
*G02F 1/01* (2006.01)
*G02F 1/025* (2006.01)

(52) U.S. Cl.
CPC .............. *G02F 1/0121* (2013.01); *G02F 1/025* (2013.01); *G02F 2201/066* (2013.01); *G02F 2201/16* (2013.01); *G02F 2203/15* (2013.01)

(58) Field of Classification Search
CPC ..... G02F 1/0018; G02F 1/0134; G02F 1/035; G02F 1/0121; G02F 1/025; G02F 2203/15; G02F 2201/16; G02F 2201/066; G02B 1/00; G02B 2207/00
USPC .......................................... 385/2–10, 14, 147
See application file for complete search history.

(56) References Cited

U.S. PATENT DOCUMENTS

| | | | |
|---|---|---|---|
| 6,895,148 B2* | 5/2005 | Gunn, III | 385/50 |
| 7,808,698 B2* | 10/2010 | Akiyama | 359/344 |
| 2002/0071454 A1* | 6/2002 | Lin | 372/6 |
| 2004/0081386 A1 | 4/2004 | Morse et al. | |
| 2009/0169149 A1 | 7/2009 | Block | |
| 2010/0098372 A1 | 4/2010 | Manipatruni et al. | |
| 2011/0293216 A1* | 12/2011 | Lipson et al. | 385/14 |
| 2014/0321848 A1* | 10/2014 | Sekiguchi | 398/38 |

FOREIGN PATENT DOCUMENTS

| | | | |
|---|---|---|---|
| CN | 1708725 A | | 12/2005 |
| JP | 2005-55882 A1 | | 3/2005 |
| JP | 2006-504145 A | | 2/2006 |
| JP | 2015022092 A | * | 2/2015 |

OTHER PUBLICATIONS

"Enhanced performance and flexibility in silicon modulators based on a coupled-ring-resonator structure structure" By Y. Li, et al; Conference on Optical Fiber communication/ National Fiber Optic Engineers Conference, Dated Feb. 8, 2008 (OFC/NFOEC 2008).*
Chinese Office Action dated Aug. 26, 2014 in the corresponding Chinese patent application No. 201210291703.5, with English translation.
Japanese Office Action for the Corresponding JP Application No. 2011-178303, mailed on Feb. 3, 2015 with partial translation.

* cited by examiner

*Primary Examiner* — Akm Enayet Ullah
(74) *Attorney, Agent, or Firm* — Kratz, Quintos & Hanson, LLP

(57) ABSTRACT

An apparatus includes an optical semiconductor element comprising: a waveguide into which input light is input; a plurality of ring modulators that have different optical perimeter lengths and are optically coupled to the waveguide; and a control unit configured to selectively apply a modulation signal to at least one of the plurality of ring modulators having a resonant wavelength that is the same as a wavelength of the input light.

6 Claims, 31 Drawing Sheets

OPTICAL SEMICONDUCTOR ELEMENT HAVING RING MODULATORS

CROSS-REFERENCE TO RELATED APPLICATION(S)

This application is based upon and claims the benefit of priority of the prior Japanese Patent Application No. 2011-178303, filed on Aug. 17, 2011, the entire contents of which are incorporated herein by reference.

FIELD

The embodiments discussed herein are related to an optical semiconductor element.

BACKGROUND

In order to reduce the size and power consumption of an optical transceiver and increase the capacity of the optical transceiver, it is important to dispose an optical device on a silicon substrate. Since an optical device formed on a silicon substrate may use an optical waveguide with a large relative refractive index difference, the optical device contributes to the reduction in size of an optical transceiver and may be integrated with an electronic circuit. Accordingly, one chip may include many optical transceivers.

In particular, the characteristic of a modulator that is an optical device has a large effect on the power consumption and size of an optical transceiver. Since a ring modulator has a small element size, a small modulation voltage, and a small optical loss, the ring modulator contributes to the reduction in size and power consumption of an optical transceiver.

Patent Document

Patent Document

Japanese Laid-open Patent Publication No. 2005-055882.

However, in a ring modulator, when the modulation efficiency of the ring modulator is increased, a wavelength band in which modulation may be performed is narrowed.

SUMMARY

According to an aspect of the embodiments, an apparatus includes an optical semiconductor element comprising: a waveguide into which input light is input; a plurality of ring modulators that have different round-trip optical path lengths and are optically coupled to the waveguide; and a control unit configured to selectively apply a modulation signal to at least one of the plurality of ring modulators having a resonant wavelength that is the same as a wavelength of the input light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

First Embodiment

An optical semiconductor element according to the first embodiment will be described with reference to FIGS. 1 to 16.

Figure 1:
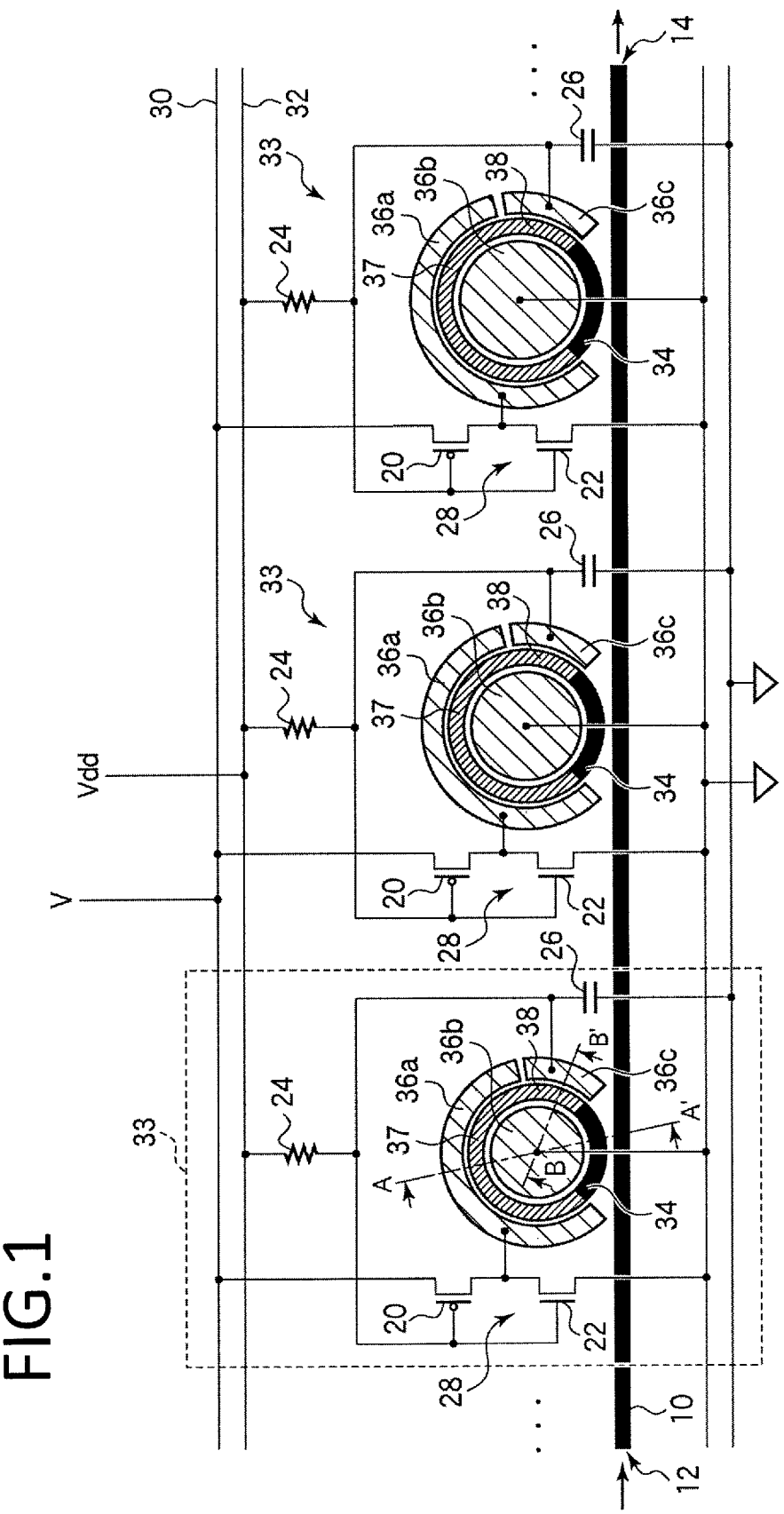
FIG. 1 is a schematic diagram illustrating the structure of an optical semiconductor element according to the first embodiment.
Figure 2:
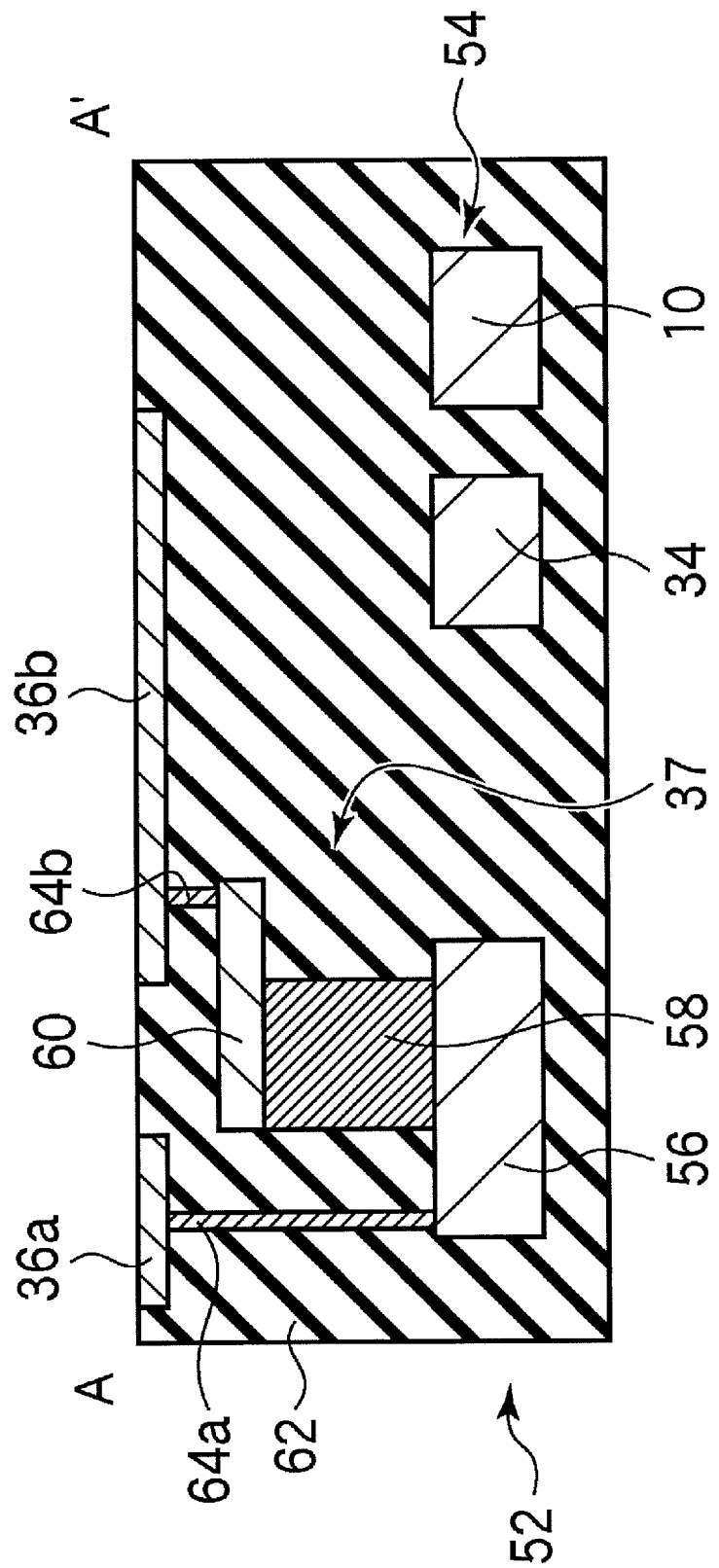
FIG. 2 is a first cross-sectional view illustrating the structure of the optical semiconductor element according to the first embodiment.
Figure 3:
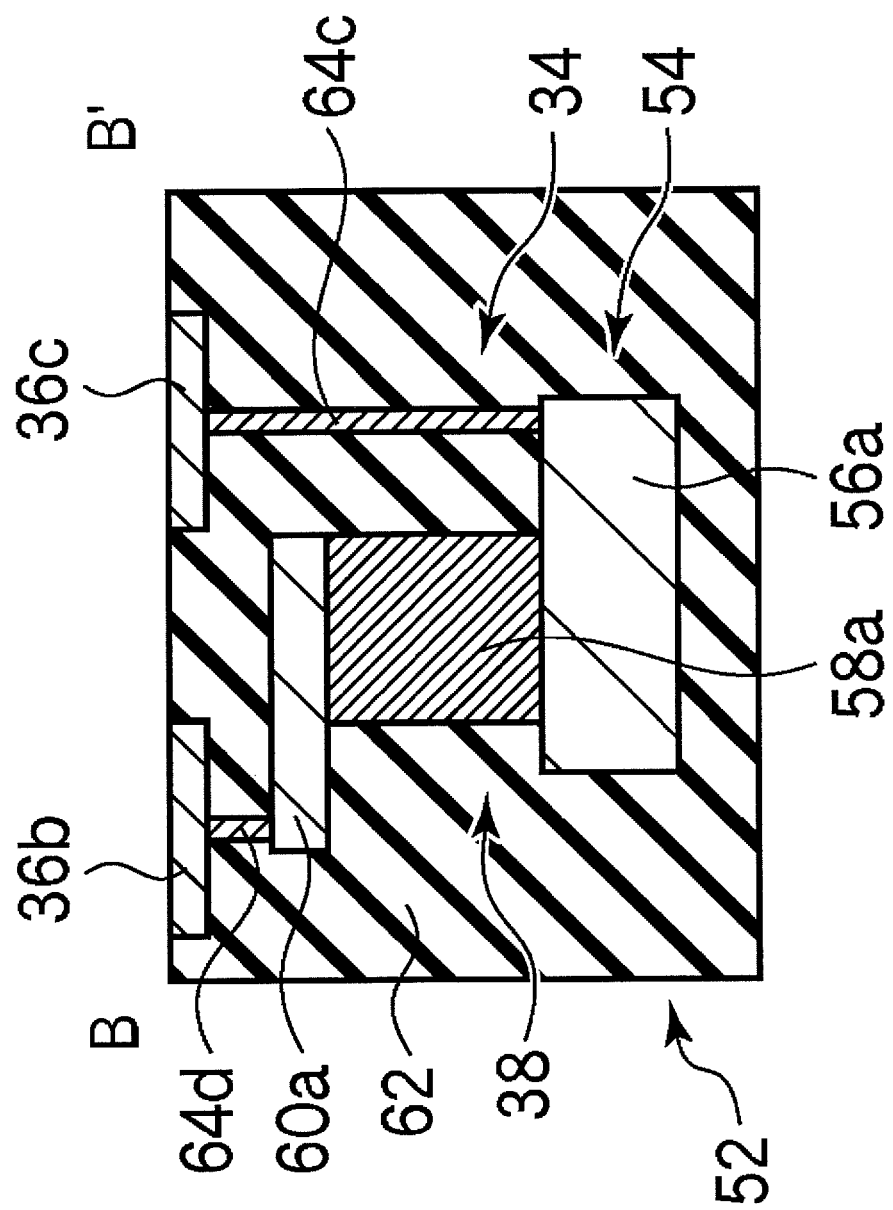
FIG. 3 is a second cross-sectional view illustrating the structure of the optical semiconductor element according to the first embodiment.
Figure 4:
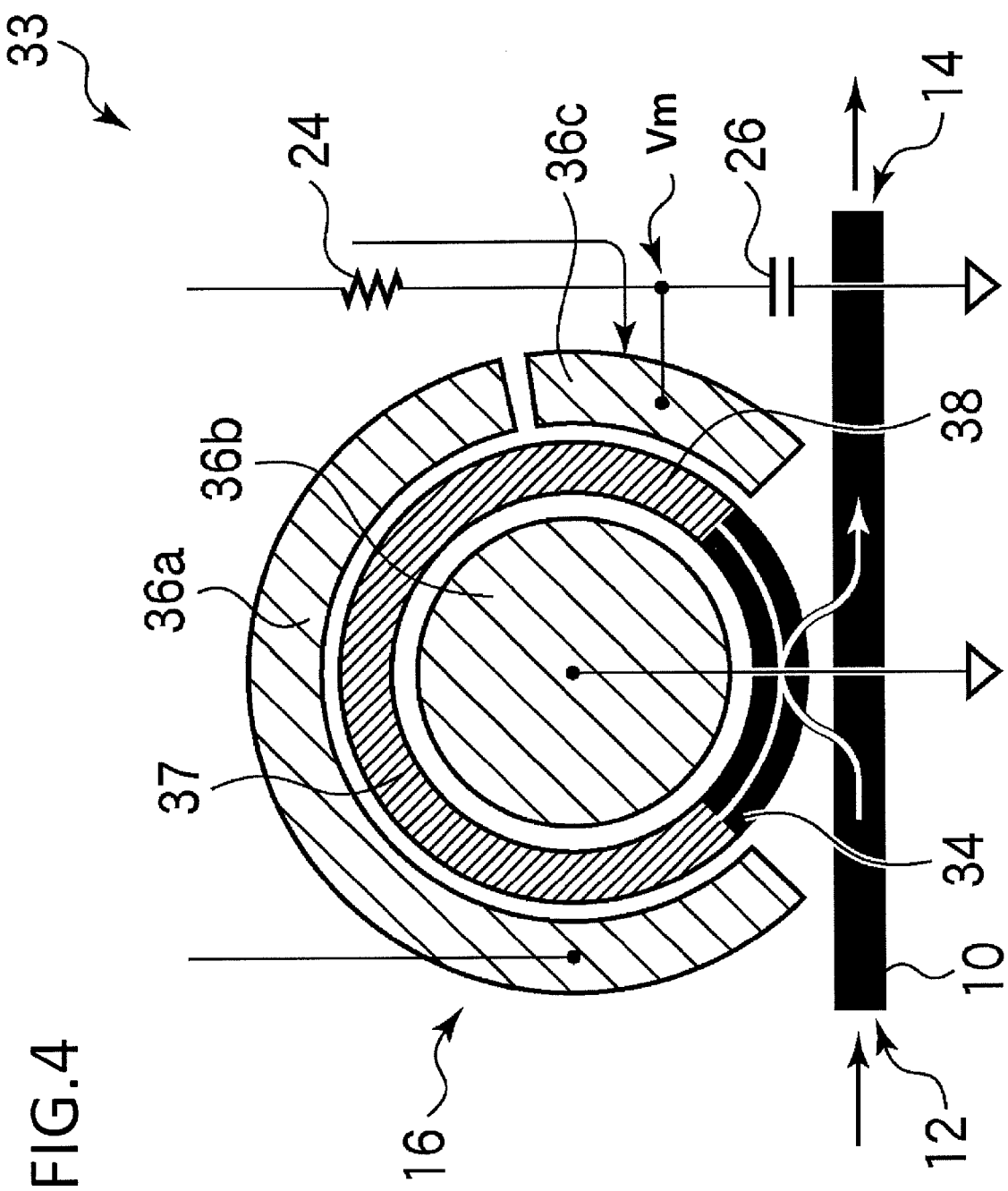
FIG. 4 is a schematic diagram illustrating the structure of a modulation unit in the optical semiconductor element according to the first embodiment.

FIG. 1 is a schematic diagram illustrating the structure of an optical semiconductor element according to this embodiment. FIGS. 2 and 3 are cross-sectional views illustrating the structure of the optical semiconductor element according to this embodiment. FIG. 4 is a schematic diagram illustrating the structure of a modulation unit in the optical semiconductor element according to this embodiment.

Figure 5:
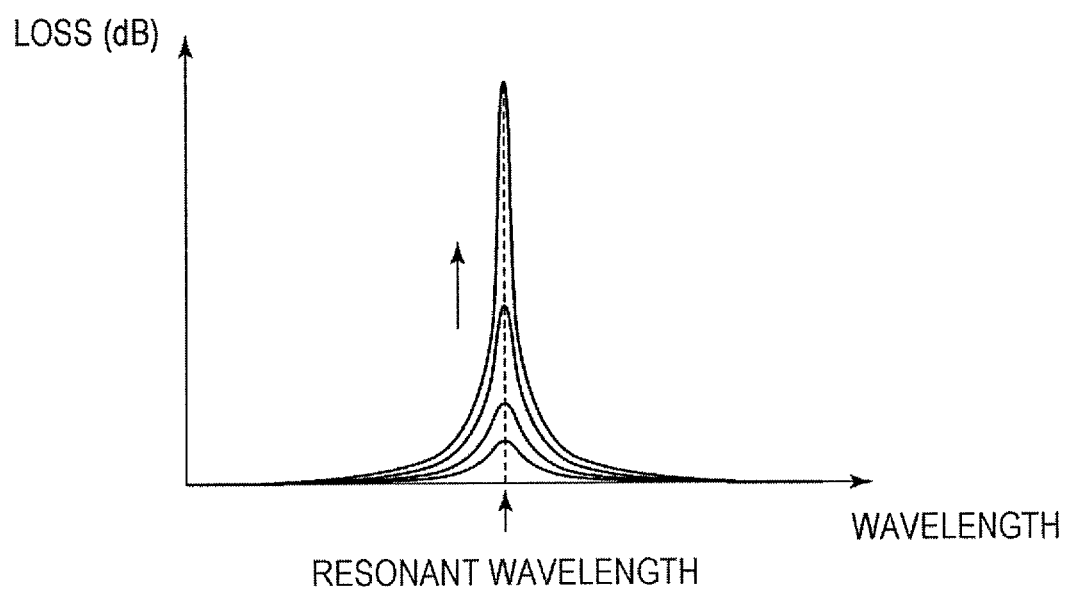
FIG. 5 is a first graph illustrating the wavelength characteristic of an optical loss in a modulation unit in an optical semiconductor element according to the first embodiment.
Figure 6:
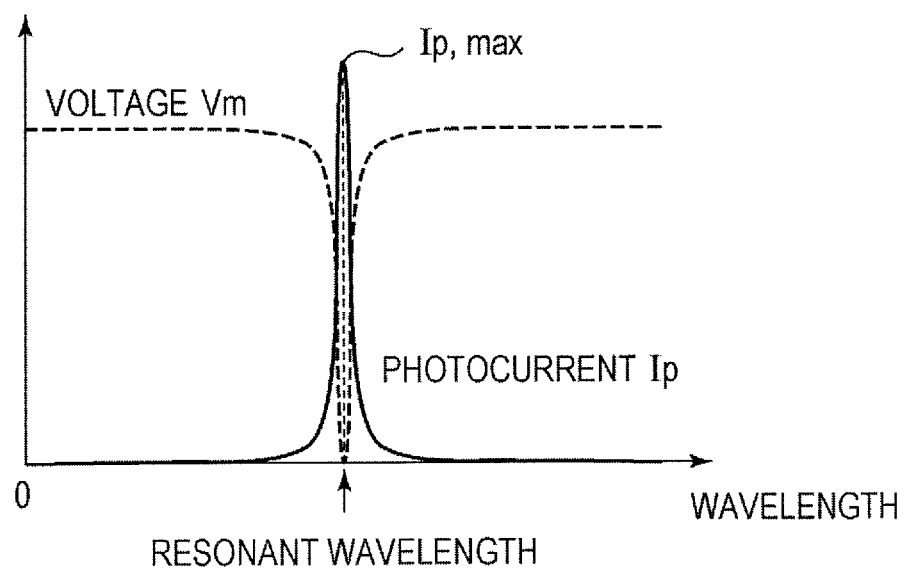
FIG. 6 is a graph illustrating the wavelength characteristics of a photocurrent and a voltage $V_m$ in a modulation unit in an optical semiconductor element according to the first embodiment.
Figure 7:
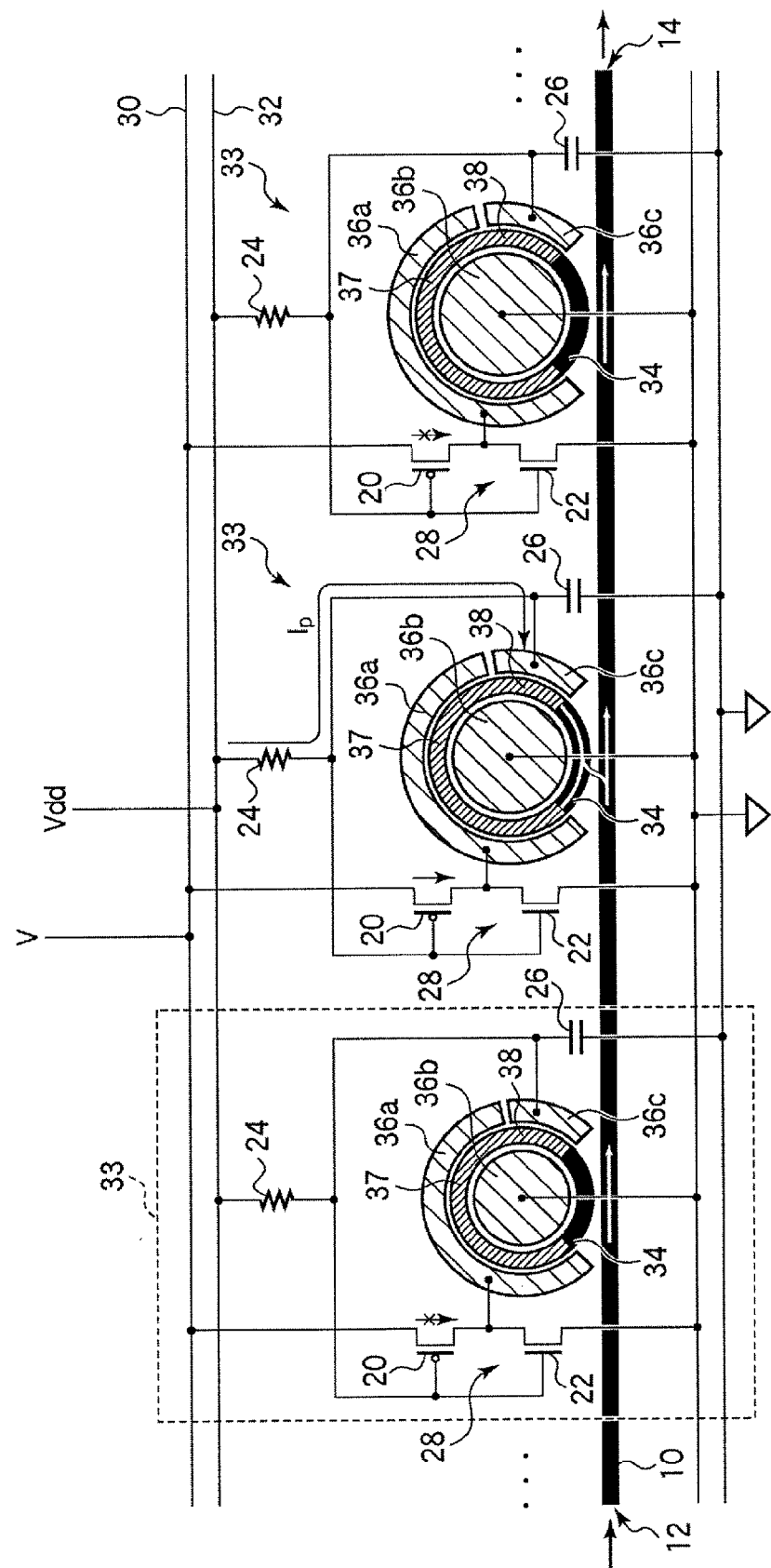
FIG. 7 is a schematic diagram illustrating the operation of the optical semiconductor element according to the first embodiment.
Figure 8:
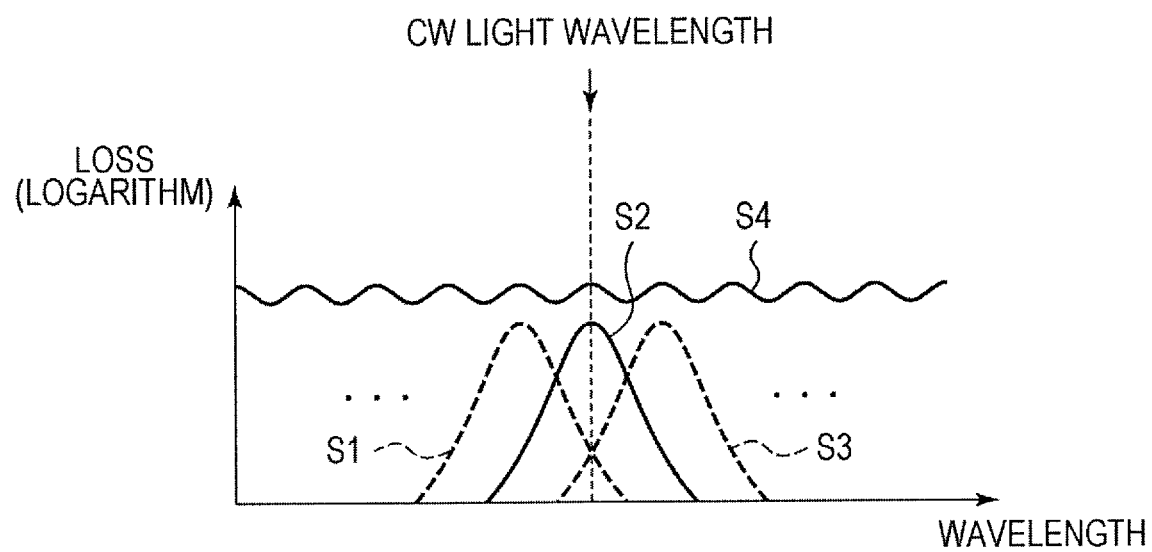
FIG. 8 is a second graph illustrating the wavelength characteristic of an optical loss in a modulation unit in an optical semiconductor element according to the first embodiment.
Figure 9:
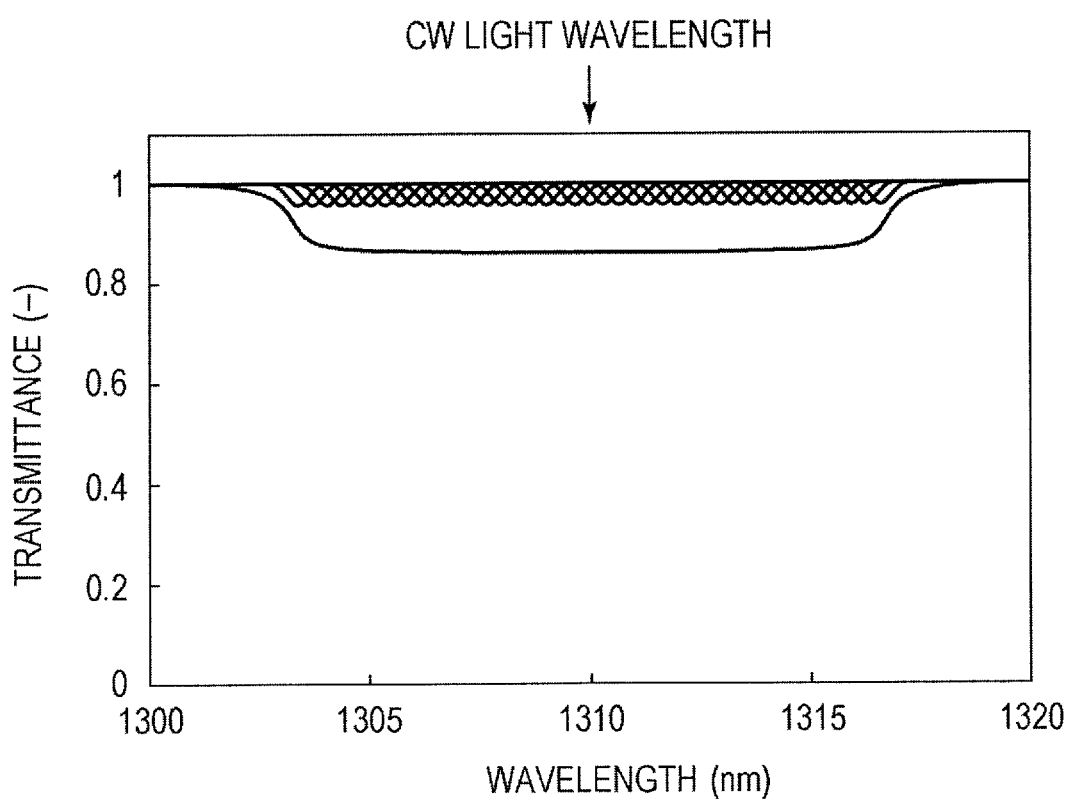
FIG. 9 is a first graph illustrating the wavelength characteristic of a transmittance of an optical semiconductor element according to the first embodiment.
Figure 10:
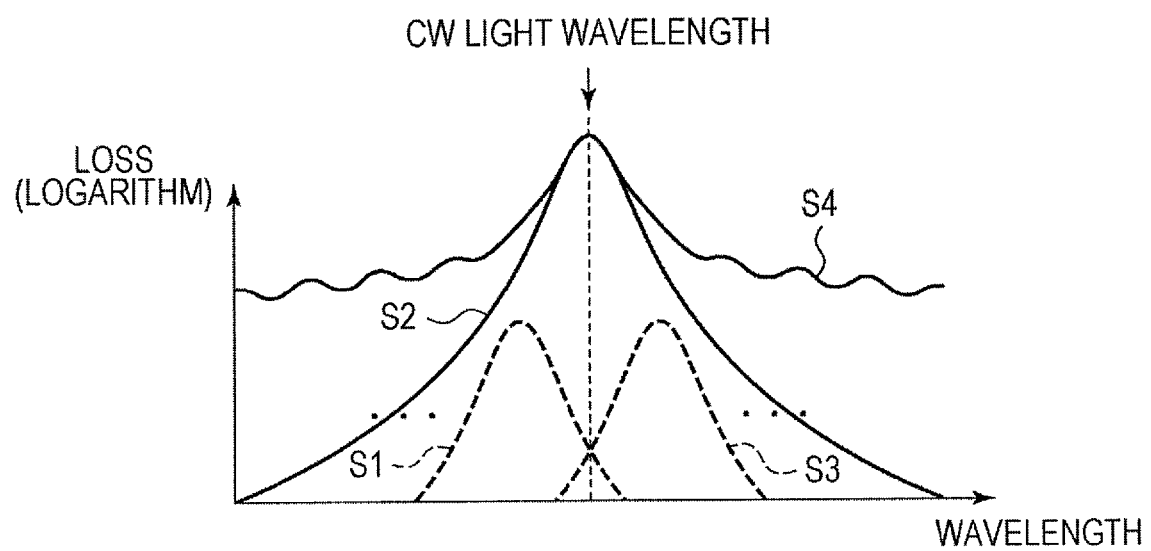
FIG. 10 is a third graph illustrating the wavelength characteristic of an optical loss in a modulation unit in an optical semiconductor element according to the first embodiment.
Figure 11:
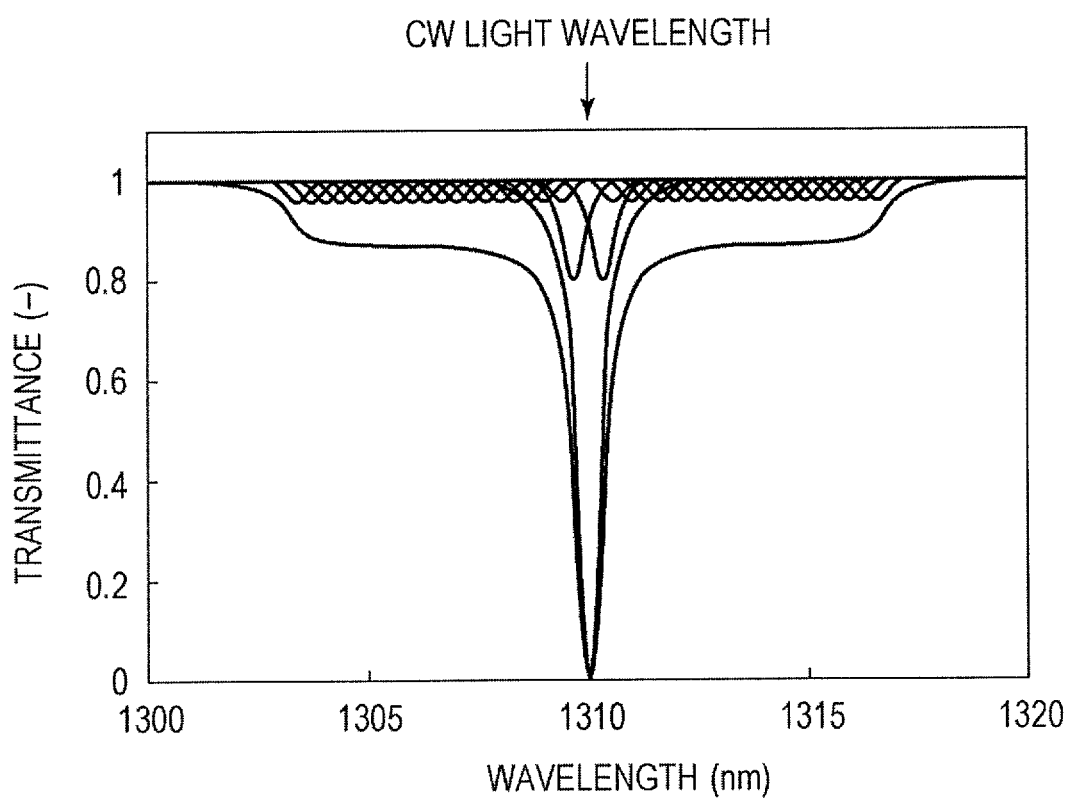
FIG. 11 is a second graph illustrating the wavelength characteristic of a transmittance of an optical semiconductor element according to the first embodiment.
Figure 12:
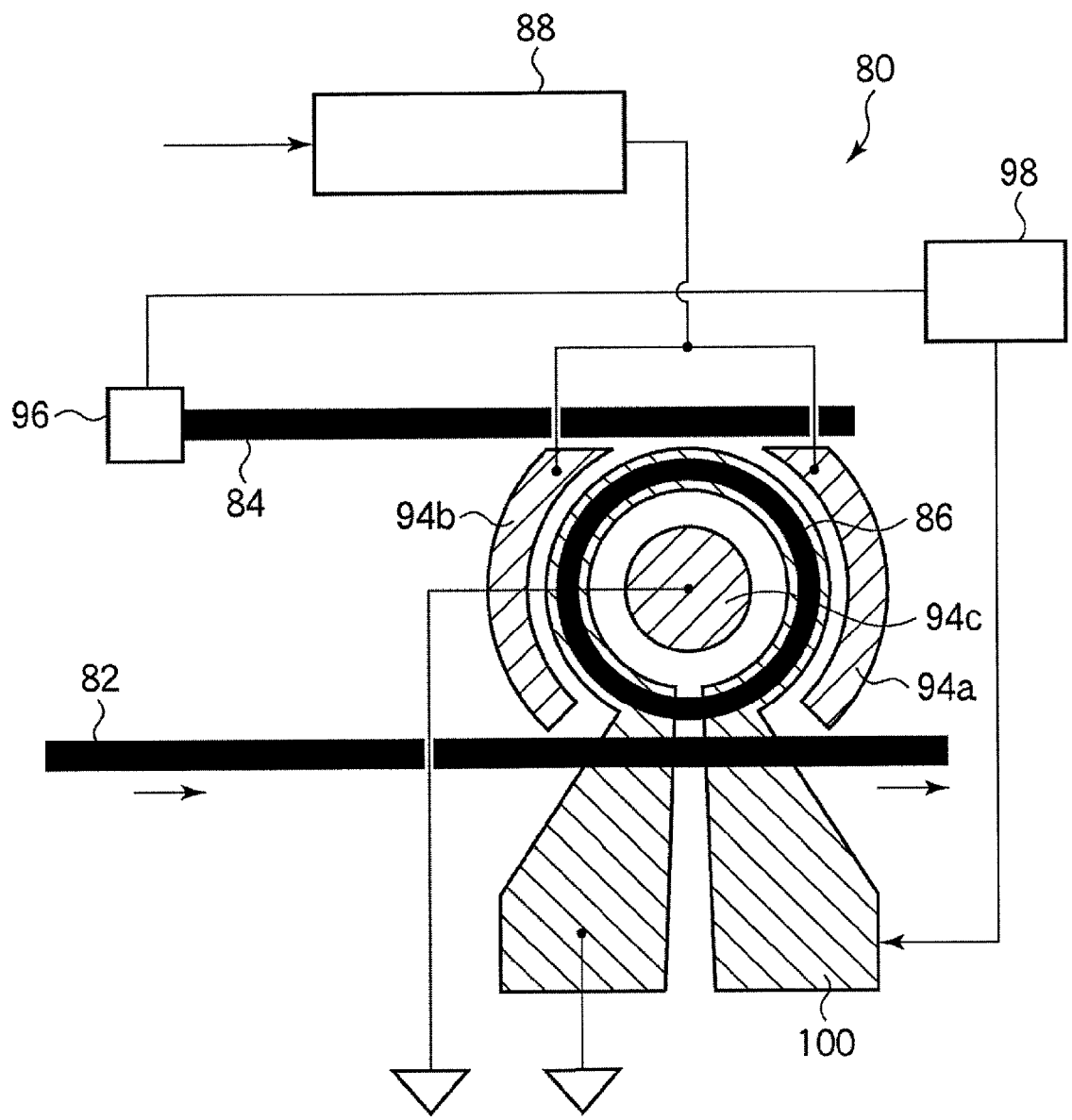
FIG. 12 is a schematic diagram illustrating the structure of an optical semiconductor element that is a reference.

FIGS. 5, 8, and 10 are graphs illustrating the wavelength characteristic of an optical loss in a modulation unit in an optical semiconductor element according to this embodiment. FIG. 6 is a graph illustrating the wavelength characteristics of a photocurrent and a voltage $V_m$ in a modulation unit in an optical semiconductor element according to this embodiment. FIG. 7 is a schematic diagram illustrating the operation of the optical semiconductor element according to this embodiment. FIGS. 9 and 11 are graphs illustrating the wavelength characteristic of a transmittance of an optical semiconductor element according to this embodiment. FIG. 12 is a schematic diagram illustrating the structure of an optical semiconductor element that is a reference. FIGS. 13 to 16 are graphs illustrating the wavelength characteristic of modulated light output power in an optical semiconductor element that is a reference.

First, the structure of an optical semiconductor element according to this embodiment will be described with reference to FIGS. 1 to 3. FIG. 2 is a cross-sectional view of the optical semiconductor element taken along the line A-A' of FIG. 1. FIG. 3 is a cross-sectional view of the optical semiconductor element taken along the line B-B' of FIG. 1.

As illustrated in FIG. 1, an optical semiconductor element according to this embodiment includes a linear waveguide 10 and a plurality of modulation units 33 for modulating light input into the linear waveguide 10.

Each of the modulation units 33 includes a ring modulator that is disposed so that it is optically coupled to the linear waveguide 10. The ring modulator 16 includes a ring waveguide 34 on which an optical modulation unit 37 and an optical detection unit (optical detector) 38 are disposed. Electrodes 36a and 36b for applying a modulation signal to the optical modulation unit 37 are connected to the optical modulation unit 37. An electrode 36c and the electrode 36b which are electrodes for detecting a photocurrent are connected to the optical detection unit 38. The electrode 36b is shared by the optical modulation unit 37 and the optical detection unit 38. The electrode 36c for the optical detection unit 38 is connected to an input terminal of a control unit 28. The electrode 36c is further connected to a $V_{dd}$ line 32 via a resistor 24. A bypass capacitor 26 is connected between the electrode 36c and a ground line. The electrode 36a for the optical modulation unit 37 is connected to an output terminal of the control unit 28. The electrode 36b is connected to the ground line.

The control unit 28 includes a p-type depletion transistor 20 and an n-type enhancement transistor 22 which are connected in series between a modulation signal line 30 and the ground line. The gate terminals of the p-type depletion transistor 20 and the n-type enhancement transistor 22 serve as input terminals connected to the electrode 36c for the optical detection unit 38. A terminal connecting the p-type depletion transistor 20 and the n-type enhancement transistor 22 serves as an output terminal connected to the electrode 36a for the optical modulation unit 37. In this specification, the optical detection unit 38 is sometimes also called a control unit.

The modulation units 33 are designed so that the diameters of the ring waveguides 34 in the ring modulators 16 differ from one another. For example, the modulation units 33 are designed so that the diameter of the ring waveguide 34 in the ring modulator 16 is gradually increased from an input end 12 of the linear waveguide 10 into which light is input to an output end 14 of the linear waveguide 10 from which a modulated light is output.

For example, the forty-one modulation units 33 including the ring modulators 16 including the ring waveguides 34 having diameters ranging from 9950 nm to 10050 nm in 2.5 nm steps are sequentially disposed from the input end 12 of the linear waveguide 10.

The setting range of the diameter of the ring waveguide 34 is determined as appropriate so that a resonant wavelength range of the ring modulator 16 determined by the diameter (optical perimeter length) of the ring waveguide 34 includes an assumed wavelength range of input light. The number of the modulation units 33 may be changed as appropriate. FIG. 1 illustrates the (n−1)th to (n+1)th modulation units 33 in the m modulation units 33.

As illustrated in FIGS. 2 and 3, the structure of an optical waveguide illustrated in FIG. 1 may be obtained with a Silicon On Insulator (SOI) substrate 52.

For example, each of the linear waveguide 10 and the ring waveguides 34 is formed by patterning an SOI layer 54 in a mesa.

For example, the optical modulation unit 37 may be formed with a p$^+$ type conductive layer 56 formed at a part of the ring waveguide 34, an SiGe light absorption layer 58 epitaxially grown on the p$^+$ type conductive layer 56, and a polycrystalline silicon n$^+$ type conductive layer 60 formed on the light absorption layer 58.

The optical detection unit 38 may be formed with a p$^+$ type conductive layer 56a formed at another part of the ring waveguide 34, an SiGe light absorption layer 58a epitaxially grown on the p$^+$ type conductive layer 56a, and a polycrystalline silicon n$^+$ type conductive layer 60a formed on the light absorption layer 58a.

Around the linear waveguide 10, the ring waveguide 34, the optical modulation unit 37, and the optical detection unit 38, a silicon oxide layer 62 is formed. The silicon oxide layer 62 functions as cladding surrounding the linear waveguide 10 and the ring waveguide 34.

The electrodes 36a, 36b, and 36c are formed on the silicon oxide layer 62. The electrode 36a is connected to the p+ type conductive layer 56 via a VIA line 64a in the silicon oxide layer 62. The electrode 36b is connected to the n+ type conductive layers 60 and 60a via VIA lines 64b and 64d in the silicon oxide layer 62, respectively. The electrode 36c is connected to the p+ type conductive layer 56a via a VIA line 64c in the silicon oxide layer 62. The electrodes 36a, 36b, and 36c may be made of, for example, copper. The VIA lines 64a to 64d may be made of, for example, tungsten.

Next, the operation of the optical semiconductor element according to this embodiment will be described with reference to FIGS. 4 to 16.

First, the basic operation of each of the modulation units 33 will be described.

As illustrated in FIG. 4, Continuous Wave (CW) light having a wavelength λ is input into the input end 12 of the linear waveguide 10. When the wavelength of the CW light input into the input end 12 of the linear waveguide 10 and the resonant wavelength of the ring modulator 16 match, the CW light is led to the ring waveguide 34 in the ring modulator 16. The light lead to the ring waveguide 34 goes around the ring waveguide 34 and is lead to the linear waveguide 10 as output light.

At a part of the ring waveguide 34, the optical modulation unit 37 is disposed. The optical modulation unit 37 is made of an electro-absorption material (EA material) whose absorption coefficient is changed in accordance with the strength of an electric field. By applying a voltage to the EA material, an absorption coefficient may be changed in the ring waveguide 34. For example, when SiGe, whose absorption coefficient is increased with the increase in electric field, is used as the EA material, an optical loss is increased in the ring waveguide 34 with the increase in voltage applied to the optical modulation unit 37 as represented by an arrow in FIG. 5.

As a result, near the resonant wavelength of the ring modulator 16, the larger the modulation signal V, the larger the loss in the ring modulator 16. The intensity of light lead from the ring modulator 16 to the linear waveguide 10 is therefore reduced. This leads to the reduction in the intensity of light output from the output end 14 of the linear waveguide 10.

Accordingly, when the wavelength of CW light and the resonant wavelength of the ring modulator 16 are similar to each other, optical intensity modulation may be performed by changing a voltage applied to the optical modulation unit 37.

At another part of the ring waveguide 34, the optical detection unit 38 is disposed. The optical detection unit 38 detects the intensity of light lead to the ring waveguide 34. A voltage $V_{dd}$ is applied to the optical detection unit 38 via the resistor 24 and the optical detection unit 38 is reverse biased. As a result, light lead to the ring modulator 16 is absorbed by the light absorption layer 58a in the optical detection unit 38, and is detected as a photocurrent $I_p$.

The photocurrent $I_p$ detected by the optical detection unit 38 is roughly proportional to optical power P in the ring modulator 16. Accordingly, as illustrated in, for example, FIG. 6, the photocurrent $I_p$ has a peak in a wavelength range in which the wavelength of CW light and the resonant wavelength of the ring modulator 16 match.

At the time of $I_p = I_{p,max}$ where $I_{p,max}$ denotes the maximum value of the photocurrent $I_p$ when the wavelength of CW light and the resonant wavelength of the ring modulator 16 match, the voltage (the voltage of the electrode 36c) applied to the optical detection unit 38 becomes the minimum. Assuming that the voltage of the electrode 36c for the optical detection unit 38 is $V_m$ and the resistance value of the resistor 24 is $R_m$, the voltage $V_m$ is represented by the following equation (1).

$$V_m = V_{dd} - R_m I_p \qquad (1)$$

Here, it is assumed that the resistance value $R_m$ of the resistor 24 is set to $V_{dd}/I_{p,max}$. In this case, the voltage $V_m$ becomes zero when the wavelength of CW light and the resonant wavelength of the ring modulator 16 match. The farther the wavelength of CW light from the resonant wavelength of the ring modulator 16, the closer the voltage $V_m$ to the voltage $V_{dd}$.

The electrode 36c is also connected to the input terminal of the control unit 28. The voltage $V_m$ of the electrode 36c is also applied to the input terminal of the control unit 28.

When the voltage $V_m$ is zero, the p-type depletion transistor 20 is turned on and the n-type enhancement transistor 22 is turned off. As a result, the modulation signal V is applied to the electrode 36a in the ring modulator 16.

On the other hand, when the voltage $V_m$ is close to the voltage $V_{dd}$, the p-type depletion transistor 20 is turned off the n-type enhancement transistor 22 is turned on. As a result, the modulation signal V is not applied to the electrode 36a in the ring modulator 16.

Thus, the control unit 28 changes an impedance between an input terminal for the modulation signal and the ring modulator 16 in accordance with the value of a signal detected by the optical detection unit 38 to assign weights to a modulation signal to be applied to the ring modulator 16.

Thus, in the modulation unit 33, when the wavelength of CW light and the resonant wavelength of the ring modulator 16 match, the modulation signal V is applied to the optical modulation unit 37 and optical intensity modulation is performed with the modulation signal V. On the other hand, when the wavelength of CW light and the resonant wavelength of the ring modulator 16 do not match, the modulation signal V is not applied to the optical modulation unit 37 and optical intensity modulation is not performed.

As described previously, an optical semiconductor element according to this embodiment includes a plurality of modulation units 33 including the ring modulators 16 having different ring lengths. Accordingly, among the modulation units 33, in the modulation unit 33 including the ring modulator 16 having a resonant wavelength that is the same as the wavelength of CW light, the modulation signal V is applied to the ring modulator 16 as represented by an arrow in FIG. 7. On the other hand, in the other modulation units 33 including the ring modulators 16 having resonant wavelengths different from the wavelength of CW light, the modulation signal V is not applied to the ring modulators 16 as represented by arrows with x in FIG. 7.

When a modulation voltage V is $V_{low}$, the modulation voltage V is applied to the ring modulator 16 (for example the ring modulator 16 in the nth modulation unit 33) having a resonant wavelength that is the same as the wavelength of CW light. However, since the value of the modulation voltage V is small, an optical loss is not increased. In the ring modulators 16 having resonant wavelengths different from the wavelength of CW light, since the modulation voltage V is not applied to the ring modulators 16, an optical loss is not increased. Accordingly, a state occurs that is equivalent to that in which the modulation voltage $V_{low}$ is applied to all of the ring modulators 16, and a loss is reduced in a wavelength range including the resonant wavelengths of a plurality of ring modulators 16.

That is, loss curves S1 to S3 of the (n−1)th to (n+1)th ring modulators illustrated in FIG. 8 are obtained. A loss curve S4 represents a result of the addition of losses in all of the ring modulators. As a result, in consideration of the optical losses generated in all of the ring modulators 16, the transmission characteristic of an optical semiconductor element according to this embodiment illustrated in FIG. 9 is obtained.

As illustrated in FIG. 9, the transmittance curves of the ring modulators 16 evenly overlap. Since an optical loss generated in each of the ring modulators 16 is small at the time of the modulation voltage $V=V_{low}$, the transmission characteristic of all of the ring modulators 16 is represented by a flat curve in which a transmittance is high.

On the other hand, when the modulation voltage V is $V_{high}$, the modulation voltage $V_{high}$ is applied to the ring modulator 16 (for example the ring modulator 16 in the nth modulation unit 33) having a resonant wavelength that is the same as the wavelength of CW light and an optical loss is increased. Since the modulation voltage V is not applied to the ring modulator 16 having a resonant wavelength different from the wavelength of CW light, an optical loss is not increased. Accordingly, an optical loss is increased only near the wavelength of CW light and is small in the other wavelength ranges.

That is, loss curves S1 to S3 of the (n−1)th to (n+1)th ring modulators illustrated in FIG. 10 are obtained. A loss curve S4 represents a result of the addition of losses of all of the ring modulators. As a result, in consideration of the optical losses generated in all of the ring modulators 16, the transmission characteristic of an optical semiconductor element according to this embodiment illustrated in FIG. 11 is obtained.

Thus, by selectively driving only the ring modulator 16 that resonates with the wavelength of CW light to be modulated, it is possible to efficiently perform operations for CW lights having various wavelengths with ring resonators having narrow wavelength bands.

Next, a merit in using an optical semiconductor element according to this embodiment will be described by comparing it with an optical semiconductor element that is a reference.

As illustrated in FIG. 12, an optical semiconductor element 80 that is a comparative example includes linear waveguides 82 and 84 and a ring waveguide 86 formed therebetween. CW light input from one end of the linear waveguide 82 is output from the other end of the linear waveguide 82. The resonant wavelength of the ring waveguide 86 is changed with a modulation signal from a driver circuit 88 which is applied between each of electrodes 94a and 94b and an electrode 94c, so that light output from the other end of the linear waveguide 82 is modulated. In the optical semiconductor element 80, a control unit 98 controls a heater 100 in accordance with a current detected by a photodetector 96 connected to the linear waveguide 84 so as to make the wavelength of CW light and the resonant wavelength of the ring waveguide 86 conform to each other.

In the optical semiconductor element 80 illustrated in FIG. 12, it is assumed that a power transmittance set in accordance with the distance between the linear waveguide 82 and the ring waveguide 86 is $T_1$ and a power transmittance set in accordance with the distance between the linear waveguide 84 and the ring waveguide 86 is $T_2$. A power transmittance is the fraction of light power transmitted from a waveguide to another waveguide. The smaller the distance between waveguides, the higher the power transmittance. The higher the power transmittance, that is, the smaller the distance between the waveguides, the wider the peak wavelength band in a modulated light output power curve.

Figure 13:
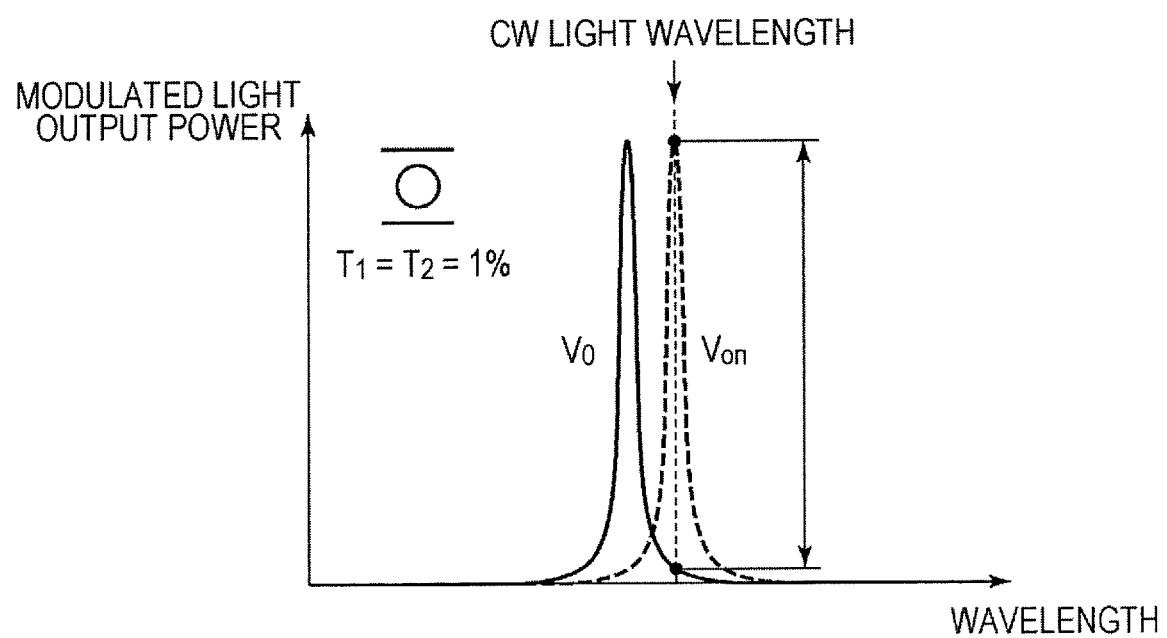
FIG. 13 is a first graph illustrating the wavelength characteristic of modulated light output power in an optical semiconductor element that is a reference.

When the power transmittance is low, for example, $T_1=T_2=1\%$, modulated light output power curves illustrated in FIG. 13 are obtained. In a state in which a modulation signal is not applied to the ring waveguide 86 (voltage $V_0$), a modulated light output power curve represented by a solid line is obtained. In a state in which a modulation signal is applied to the ring waveguide 86 (voltage $V_{on}$), a modulated light output power curve represented by a dotted line is obtained.

Thus, when a power transmittance is low, the peak of each modulated light output power curve becomes steep and the peak wavelength band in the modulated light output power curve becomes narrow. This indicates that the change in modulated light output power with respect to the change in a modulation signal is large. The steep modulated light output power curve is efficient for the improvement in the modulation efficiency of an optical semiconductor element.

Figure 14:
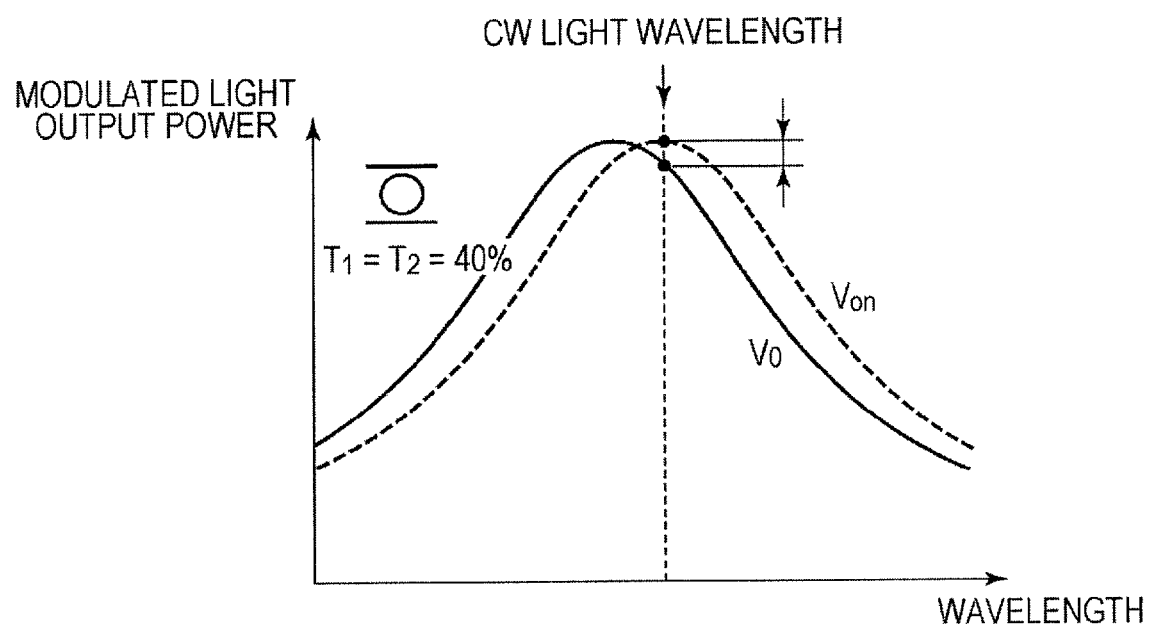
FIG. 14 is a second graph illustrating the wavelength characteristic of modulated light output power in an optical semiconductor element that is a reference.
Figure 15:
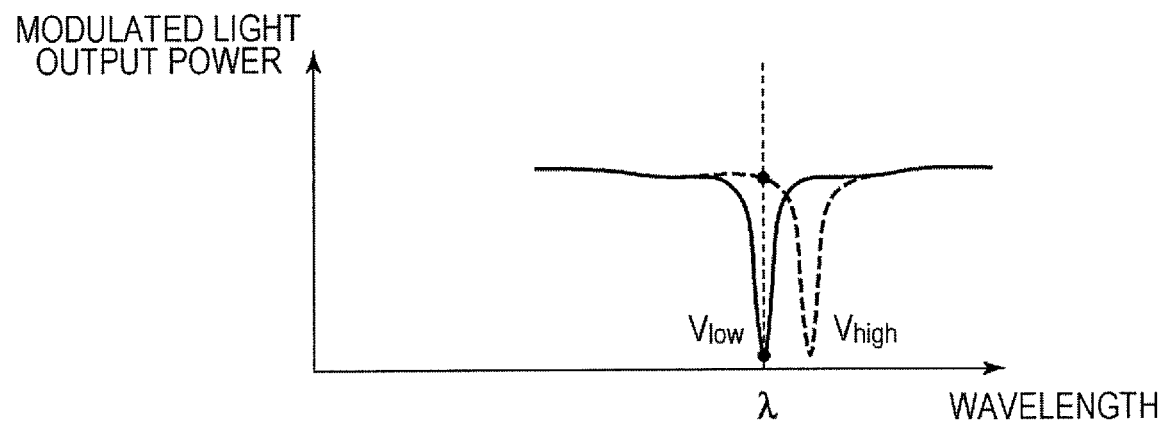
FIG. 15 is a third graph illustrating the wavelength characteristic of modulated light output power in an optical semiconductor element that is a reference.
Figure 16:
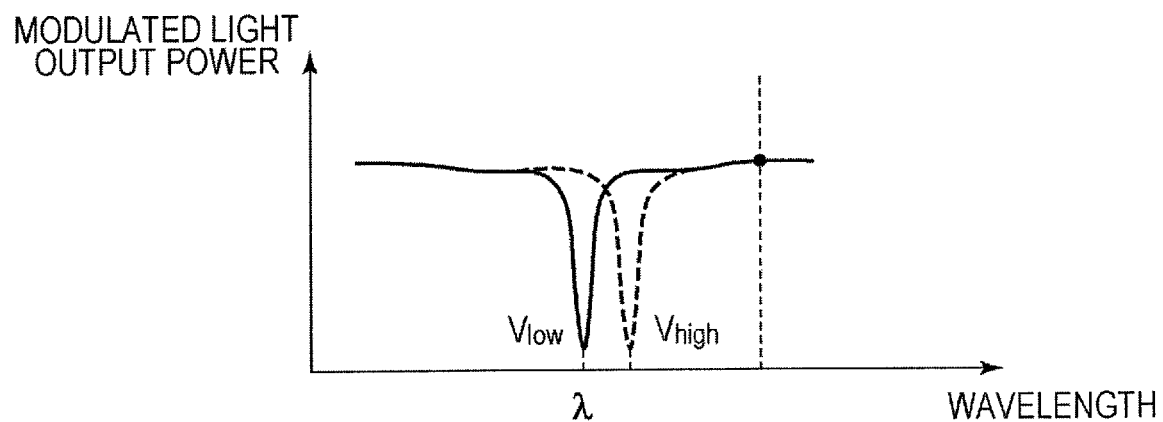
FIG. 16 is a fourth graph illustrating the wavelength characteristic of modulated light output power in an optical semiconductor element that is a reference.

On the other hand, when the power transmittance is high, for example, $T_1=T_2=40\%$, modulated light output power curves illustrated in FIG. 14 are obtained. In a state in which a modulation signal is not applied to the ring waveguide 86 (voltage $V_0$), a modulated light output power curve represented by a solid line is obtained. In a state in which a modulation signal is applied to the ring waveguide 86 (voltage $V_{on}$), a modulated light output power curve represented by a dotted line is obtained.

Thus, when a power transmittance is high, the change in modulated light output power with respect to the change in a wavelength is small and a modulation efficiency is low as represented by arrows in FIG. 14. On the other hand, since the peak wavelength band in the modulated light output power curve is wide, the permissible difference between the wavelength of input light and the resonant wavelength of the ring waveguide 86 may be increased.

In the following, the case of low power transmittance is assumed for high modulation efficiency of the optical semiconductor element 80. In a state in which a voltage is not applied between each of the electrodes 94a and 94b and the electrode 94c (voltage $V_0$) when the wavelength of CW light and the resonant wavelength of the ring waveguide 86 match, output power corresponding to a black dot on a solid line in FIG. 15 may be obtained. In a state in which a voltage is applied between each of the electrodes 94a and 94b and the electrode 94c (voltage $V_{on}$) when the wavelength of CW light and the resonant wavelength of the ring waveguide 86 match, output power corresponding to a black dot on a dotted line in FIG. 15 may be obtained.

Thus, when the wavelength of CW light and the resonant wavelength of the ring waveguide 86 match, modulated light output power may be sufficiently modulated by applying a voltage between each of the electrodes 94a and 94b and the electrode 94c.

However, the wavelength of CW light and the resonant wavelength of the ring waveguide 86 do not necessarily match because of manufacturing variations and the changes of an environmental temperature. When the wavelength of CW light and the resonant wavelength of the ring waveguide 86 do not match, modulated light output power is not sufficiently changed despite the fact that a voltage is applied to the ring waveguide 86 as illustrated in, for example, FIG. 16.

In this case, the heater 100 is used to make the resonant wavelength of the ring waveguide 86 conform to the wavelength of CW light. However, as described previously, since the wavelength band of the modulated light output power is narrow, it is difficult to make the resonant wavelength of the ring waveguide 86 conform to the wavelength of CW light.

Thus, in the optical semiconductor element 80 that is a reference, the improvement of modulation efficiency and the increase in the permissible difference between the wavelength of input light and the resonant wavelength of a ring resonator are contradictory demands.

In an optical semiconductor element according to this embodiment, since a plurality of ring resonators having different resonant wavelengths are disposed, the permissible difference between the wavelength of input light and the resonant wavelength of a ring resonator may be increased. Since a ring resonator having a resonant wavelength that is the same as the wavelength of CW light is selectively driven, a ring resonator having a narrow wavelength band of modulated light output power may be used. As a result, both the improvement of modulation efficiency and the increase in the permissible difference between the wavelength of input light and the resonant wavelength of a ring resonator may be realized at the same time. In addition, it is possible to perform operations for CW lights having various wavelengths.

According to this embodiment, since a plurality of ring modulators having different resonant wavelengths are disposed and a ring modulator having a resonant wavelength that is the same as the wavelength of CW light is selectively driven, both high-efficient modulation and wavelength control over a wide band may be realized.

Second Embodiment

An optical semiconductor element according to the second embodiment will be described with reference to FIGS. 17 and 18. The same reference numerals are used to identify parts in an optical semiconductor element according to the first embodiment already described with reference to FIGS. 1 to 16, and the description thereof will be therefore omitted or simplified.

Figure 17:
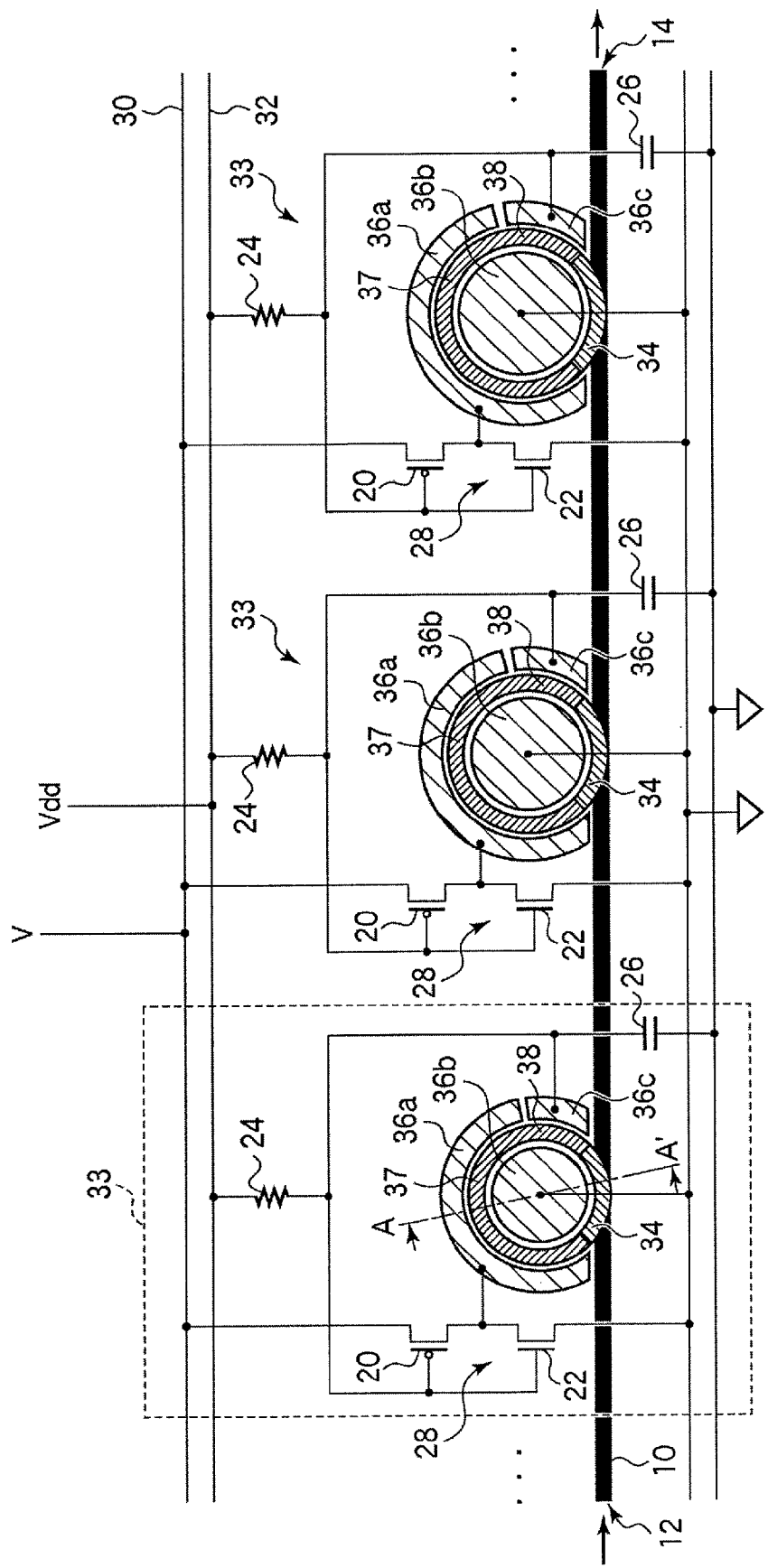
FIG. 17 is a schematic diagram illustrating the structure of an optical semiconductor element according to a second embodiment.

FIG. 17 is a schematic diagram illustrating the structure of an optical semiconductor element according to this embodiment. FIG. 18 is a cross-sectional view of the optical semiconductor element taken along the line A-A' of FIG. 17.

As illustrated in FIG. 17, an optical semiconductor element according to this embodiment is the same as an optical semiconductor element according to the first embodiment except that the ring modulator 16 is disposed so that it is optically coupled to the upper side of the linear waveguide 10.

Figure 18:
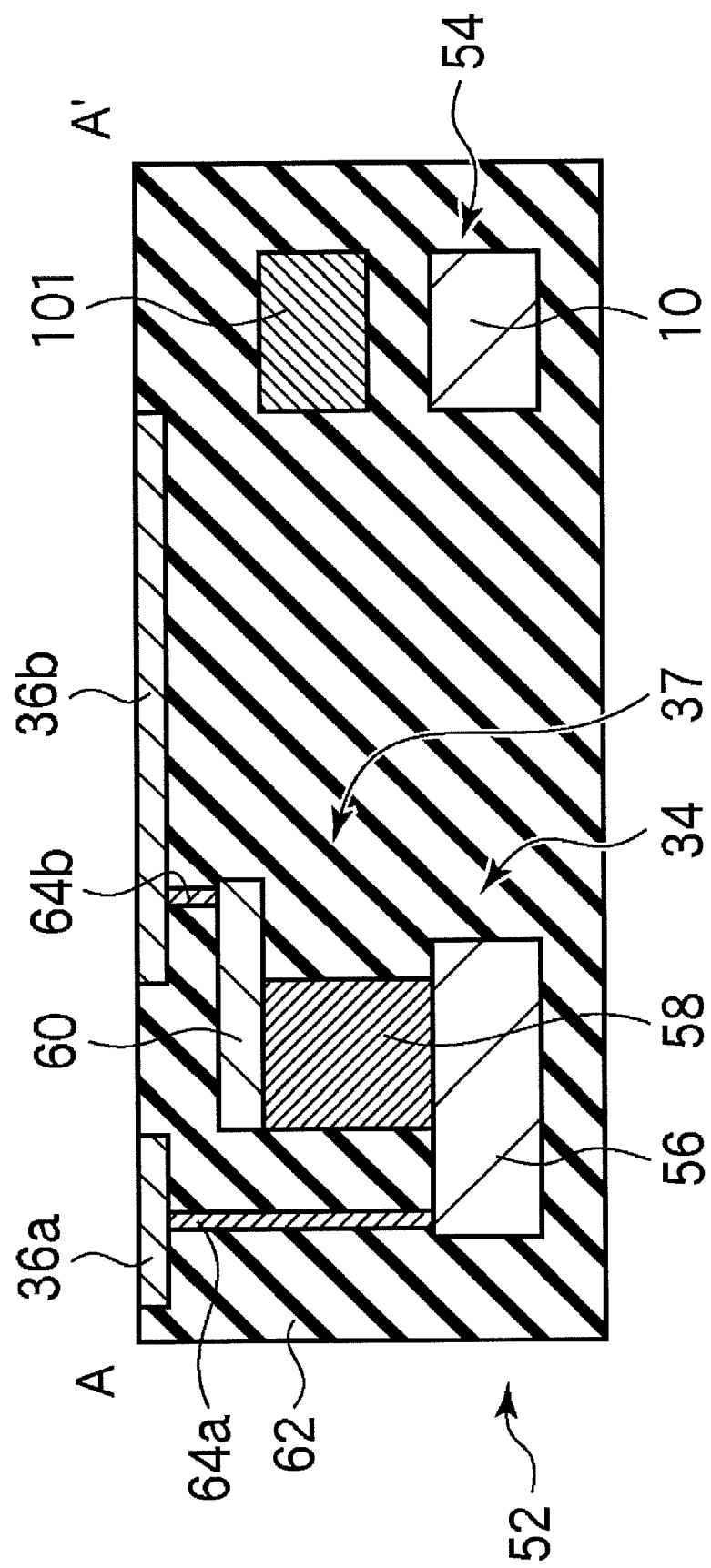
FIG. 18 is a cross-sectional view of the optical semiconductor element according to the second embodiment.

As illustrated in, for example, FIG. 18, the ring waveguide 34 may be formed with the SiGe light absorption layer 58 and an amorphous silicon layer 101 formed on the SOI layer 54. In this case, the optical modulation unit 37 and the optical detection unit 38 are formed with the SiGe light absorption layer 58, and the other part as a passive waveguide in the ring resonator is formed with the amorphous silicon layer 101.

Even in a case where the ring modulator 16 is optically coupled to the upper side of the linear waveguide 10, an optical semiconductor element according to the second embodiment may function like an optical semiconductor element according to the first embodiment.

Thus, like in the first embodiment, in this embodiment, since a plurality of ring modulators having different resonant wavelengths are disposed and a ring modulator having a resonant wavelength that is the same as the wavelength of CW light is selectively driven, both high-efficient modulation and wavelength control over a wide band may be realized.

Third Embodiment

An optical semiconductor element according to the third embodiment will be described with reference to FIGS. 19 to 23. The same reference numerals are used to identify parts in optical semiconductor elements according to the first and second embodiments already described with reference to FIGS. 1 to 18, and the description thereof will be therefore omitted or simplified.

Figure 19:
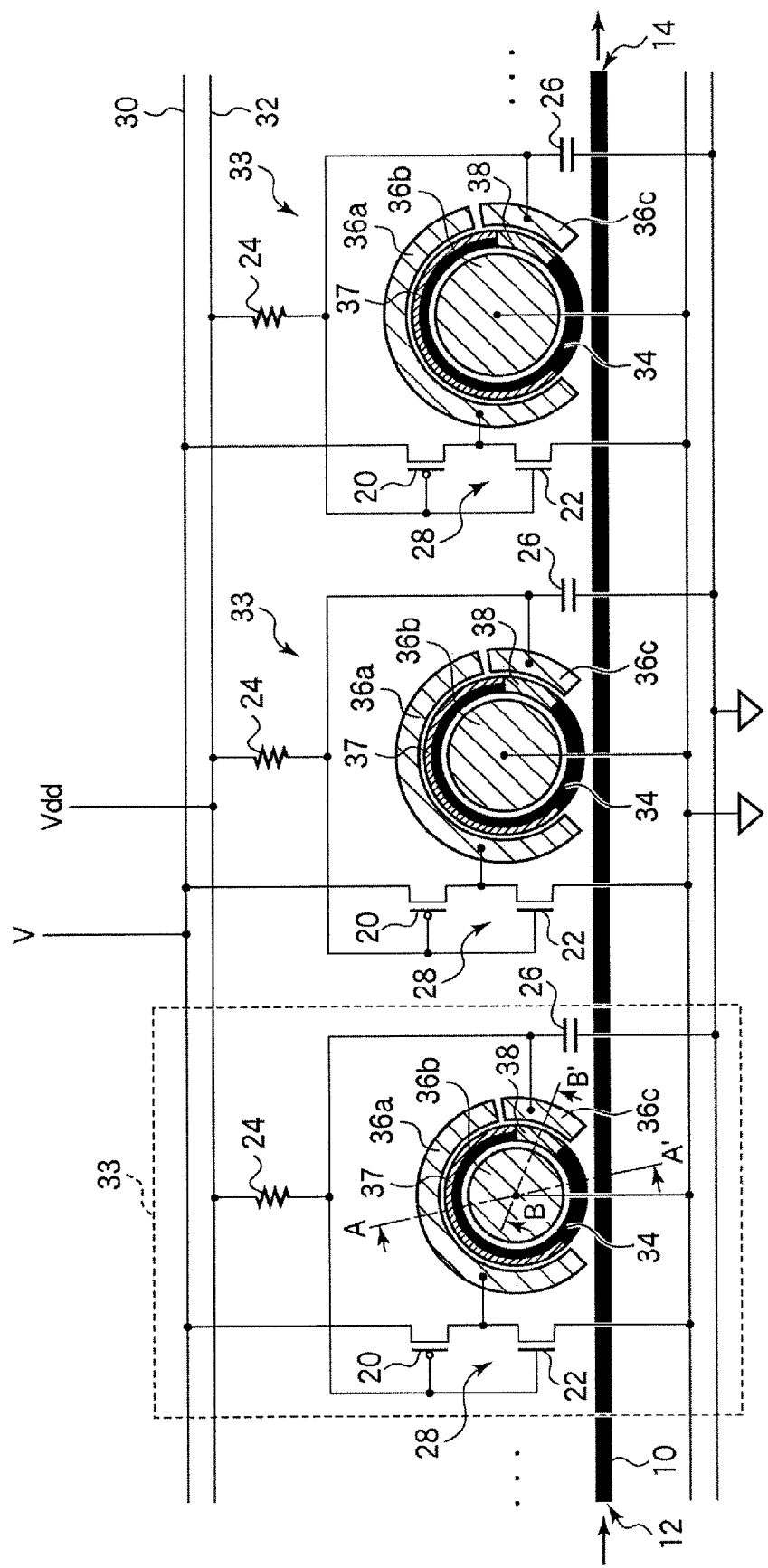
FIG. 19 is a schematic diagram illustrating the structure of an optical semiconductor element according to a third embodiment.
Figure 20:
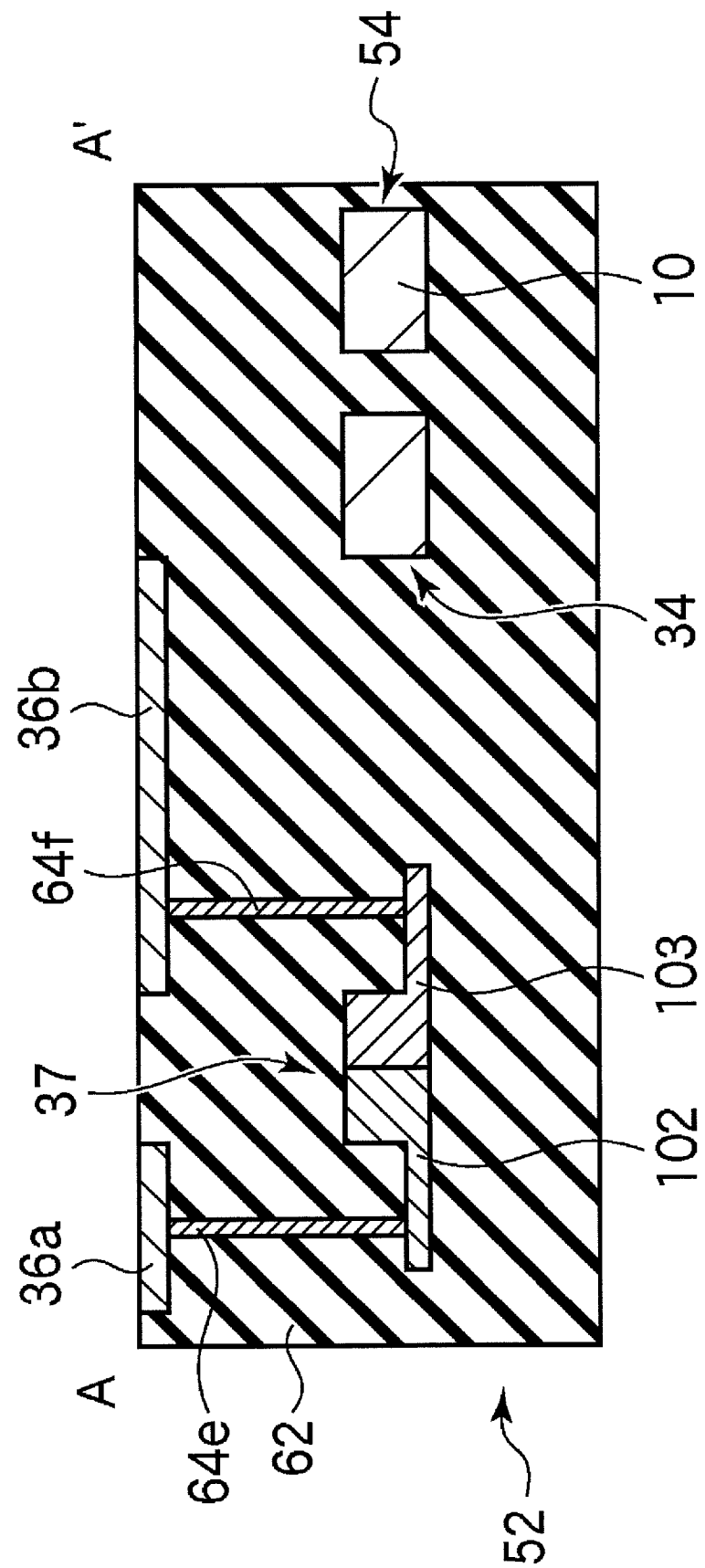
FIG. 20 is a first cross-sectional view illustrating the structure of the optical semiconductor element according to the third embodiment.

FIG. 19 is a schematic diagram illustrating the structure of an optical semiconductor element according to this embodiment. FIG. 20 is a cross-sectional view of the optical semiconductor element taken along the line A-A' of FIG. 19.

Figure 21:
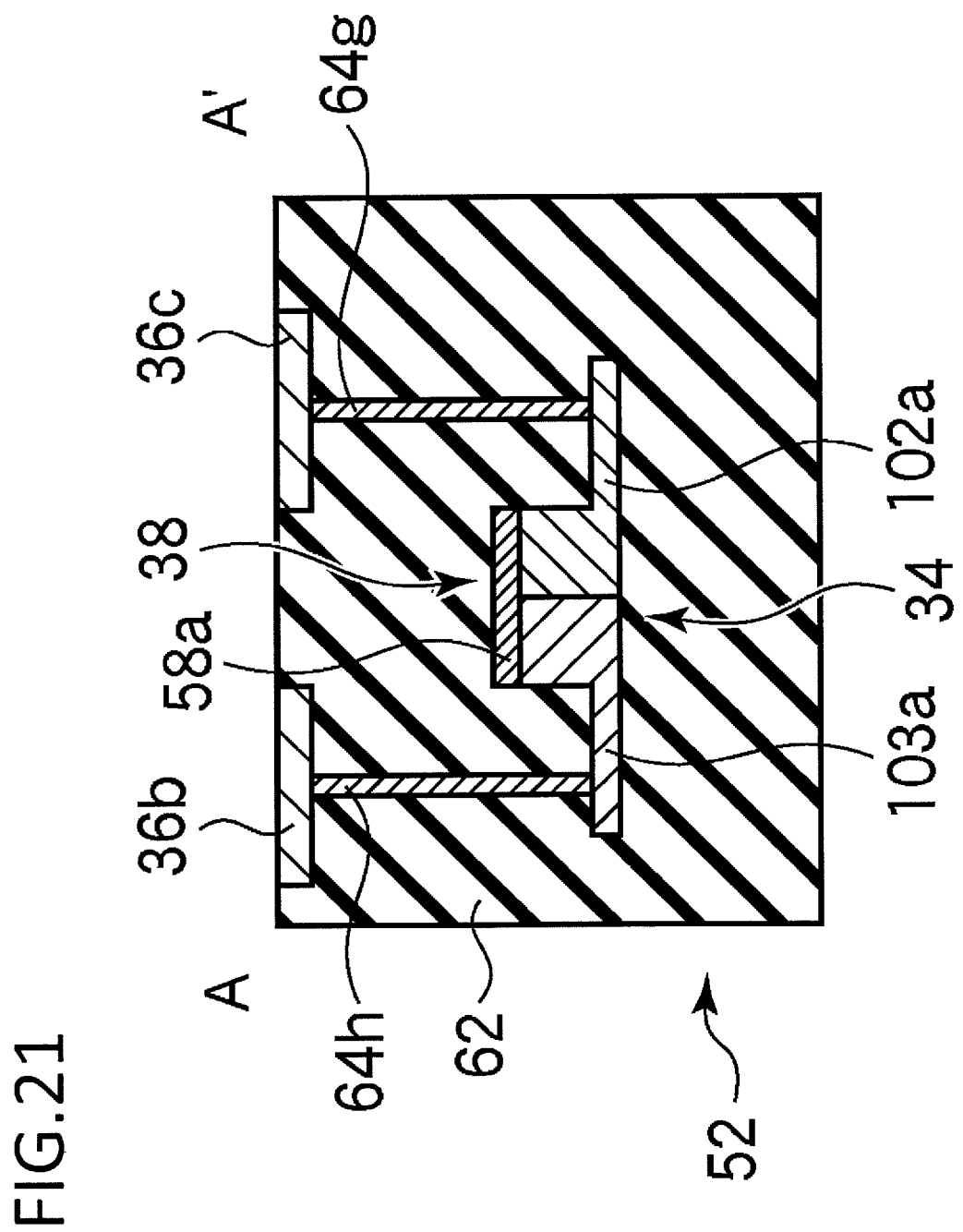
FIG. 21 is a second cross-sectional view illustrating the structure of the optical semiconductor element according to the third embodiment.
Figure 22:
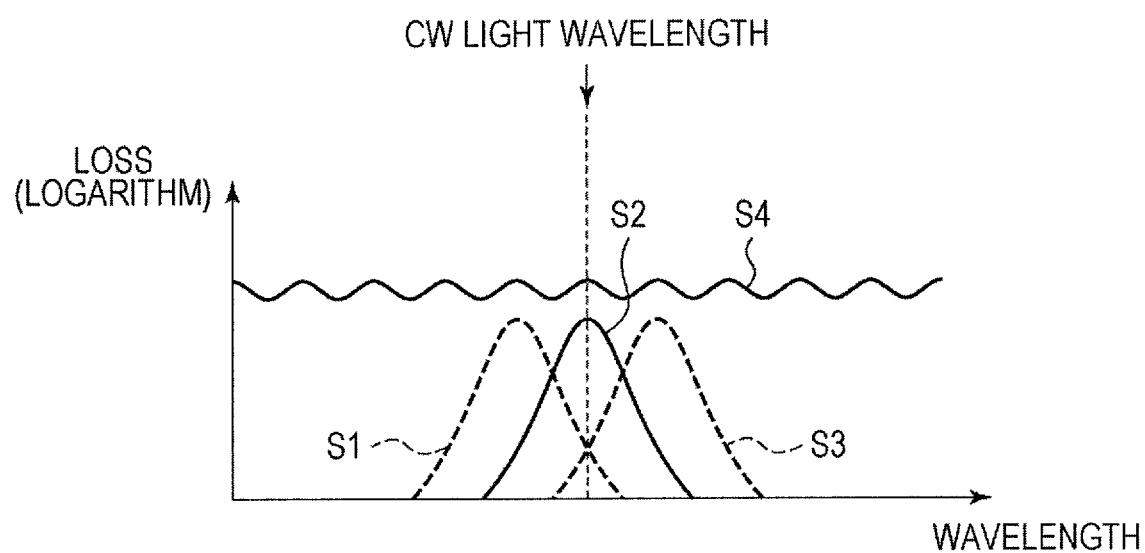
FIG. 22 is a first graph illustrating the wavelength characteristic of an optical loss in a modulation unit in an optical semiconductor element according to the third embodiment.
Figure 23:
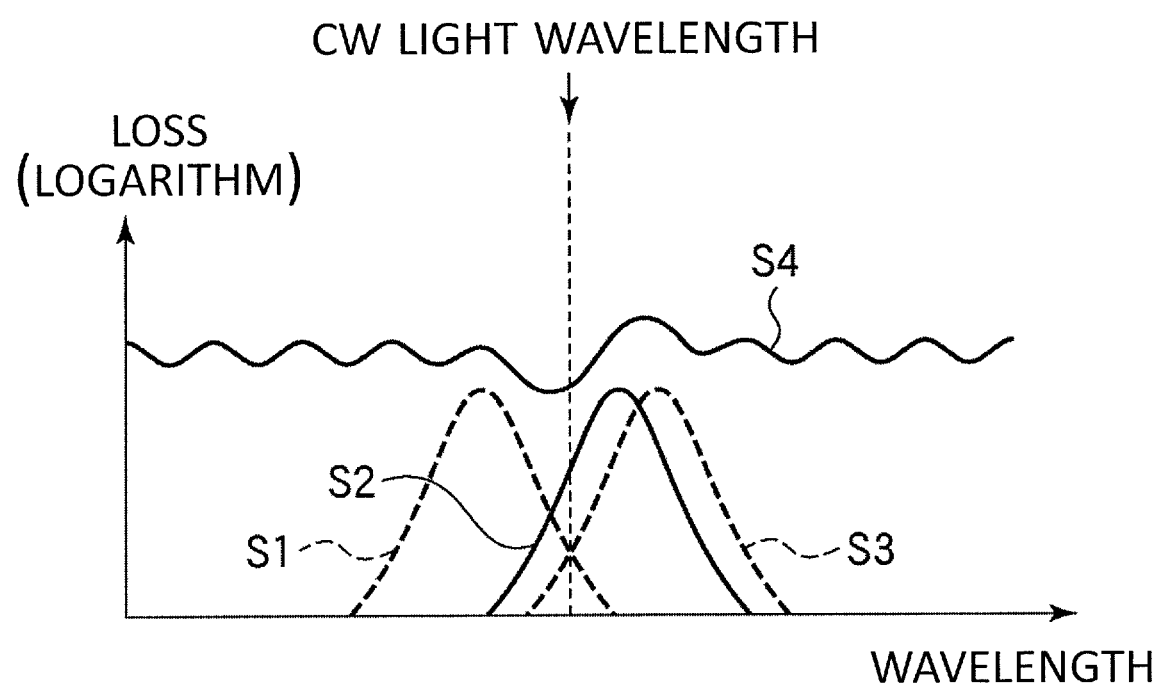
FIG. 23 is a second graph illustrating the wavelength characteristic of an optical loss in a modulation unit in an optical semiconductor element according to the third embodiment.

FIG. 21 is a cross-sectional view of the optical semiconductor element taken along the line B-B' of FIG. 19. FIGS. 22 and 23 are graphs illustrating the wavelength characteristic of an optical loss in a modulation unit in an optical semiconductor element according to this embodiment.

As illustrated in FIG. 19, an optical semiconductor element according to this embodiment is the same as an optical semiconductor element according to the first embodiment except the structures of the optical modulation unit 37 and the optical detection unit 38.

As illustrated in, for example, FIG. 20, the optical modulation unit 37 includes an n-type region 102 and a p-type region 103 formed on the outer and inner radial sides of the ring waveguide 34 along an optical waveguide direction. The positions of the n-type region 102 and the p-type region 103 may be changed.

As illustrated in, for example, FIG. 21, the optical detection unit 38 includes an n-type region 102a and a p-type region 103a formed on the outer and inner radial sides of the ring waveguide 34 along the optical waveguide direction and the SiGe light absorption layer 58a epitaxially grown on the n-type region 102a and the p-type region 103a.

The electrodes 36a, 36b, and 36c formed on the silicon oxide layer 62. The electrode 36a is connected to the n-type region 102 via a VIA line 64e in the silicon oxide layer 62. The electrode 36b is connected to the p-type regions 103 and 103a via VIA lines 64f and 64h in the silicon oxide layer 62, respectively. The electrode 36c is connected to the n-type region 102a via a VIA line 64g. The VIA lines 64e to 64h are made of, for example, tungsten.

An optical semiconductor element according to this embodiment changes the resonant wavelength of the ring modulator 16 with the modulation signal V applied between the electrodes 36a and 36b so as to modulate light to be output from the output end 14 of the linear waveguide 10. It is possible to change the resonant wavelength of the ring modulator 16 with a voltage that is applied between the electrodes 36a and 36b so as to change the refractive index of a material for the ring waveguide 34.

When the modulation voltage V is $V_{low}$, loss curves S1 to S3 of the (n−1)th to (n+1)th ring modulators illustrated in FIG. 22 are obtained. A loss curve S4 represents a result of the addition of losses in all of the ring modulators.

On the other hand, when the modulation voltage V is $V_{high}$, the resonant wavelength of the ring modulator 16 (for example the ring modulator 16 in the nth modulation unit 33) which is the same as the wavelength of CW light is shifted to a long wavelength side. Along with this, the loss curve of the ring modulator 16 is also shifted to the long wavelength side. Since the modulation voltage V is not applied to the ring modulator 16 having a resonant wavelength different from the wavelength of CW light, the resonant wavelength of the ring modulator 16 is not changed. Accordingly, an optical loss is reduced only near the wavelength of CW light and an optical loss is increased near the changed resonant wavelength of the ring modulator 16.

That is, loss curves S1 to S3 of the (n−1)th to (n+1)th ring modulators illustrated in FIG. 23 are obtained. A loss curve S4 represents a result of the addition of losses in all of the ring modulators. As a result, like in an optical semiconductor element according to the first embodiment, in an optical semiconductor element according to this embodiment, a similar modulation effect may be obtained.

Thus, like in the above-described embodiments, in this embodiment, since a plurality of ring modulators having different resonant wavelengths are disposed and a ring modulator having a resonant wavelength that is the same as the wavelength of CW light is selectively driven, both high-efficient modulation and wavelength control over a wide band may be realized.

Fourth Embodiment

An optical semiconductor element according to the fourth embodiment will be described with reference to FIGS. 24 to 27. The same reference numerals are used to identify parts in optical semiconductor elements according to the first to third embodiments already described with reference to FIGS. 1 to 23, and the description thereof will be therefore omitted or simplified.

Figure 24:
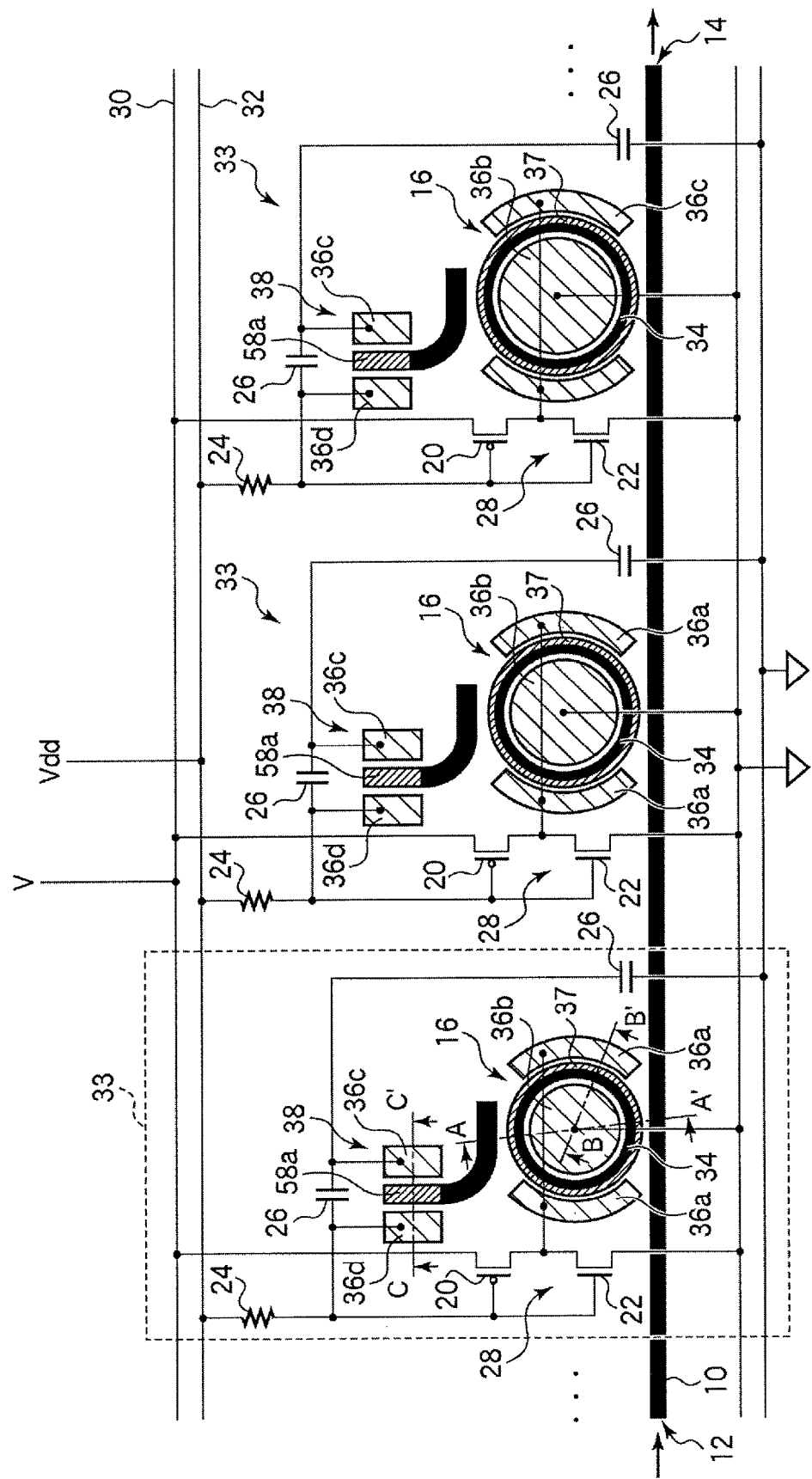
FIG. 24 is a schematic diagram illustrating the structure of an optical semiconductor element according to a fourth embodiment.
Figure 25:
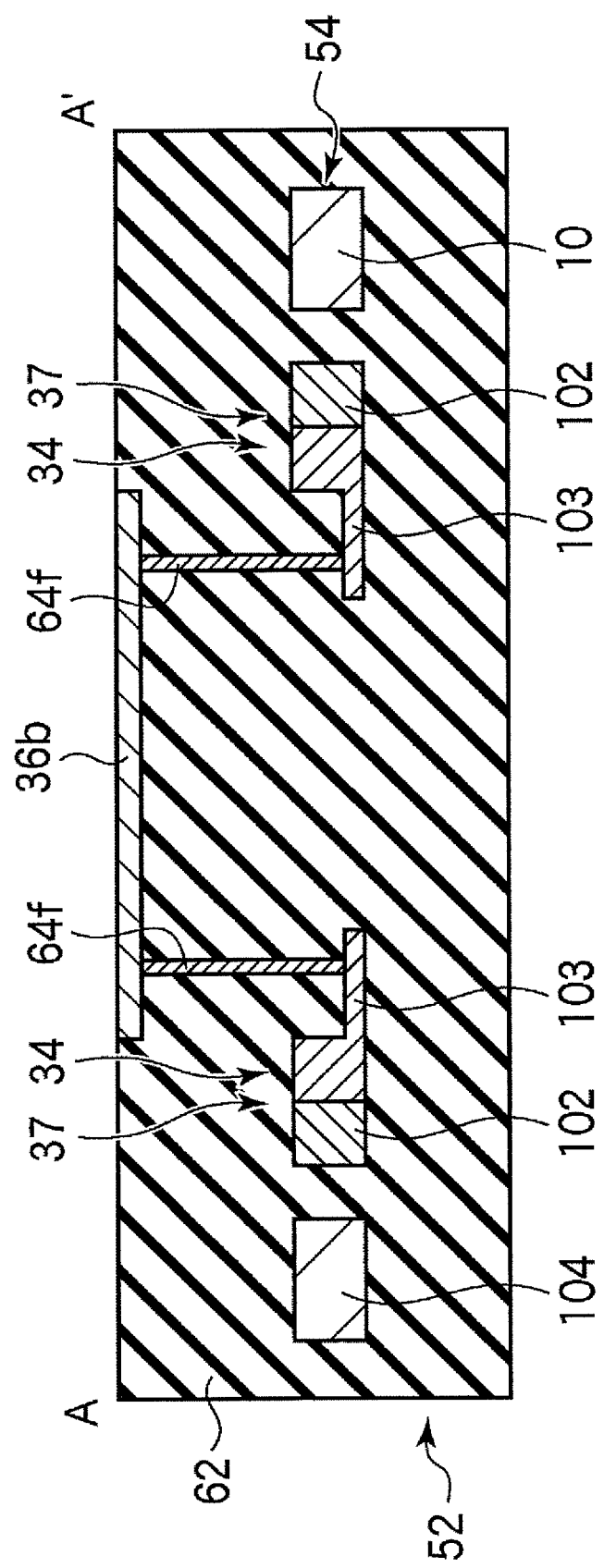
FIG. 25 is a first cross-sectional view illustrating the structure of the optical semiconductor element according to the fourth embodiment.
Figure 26:
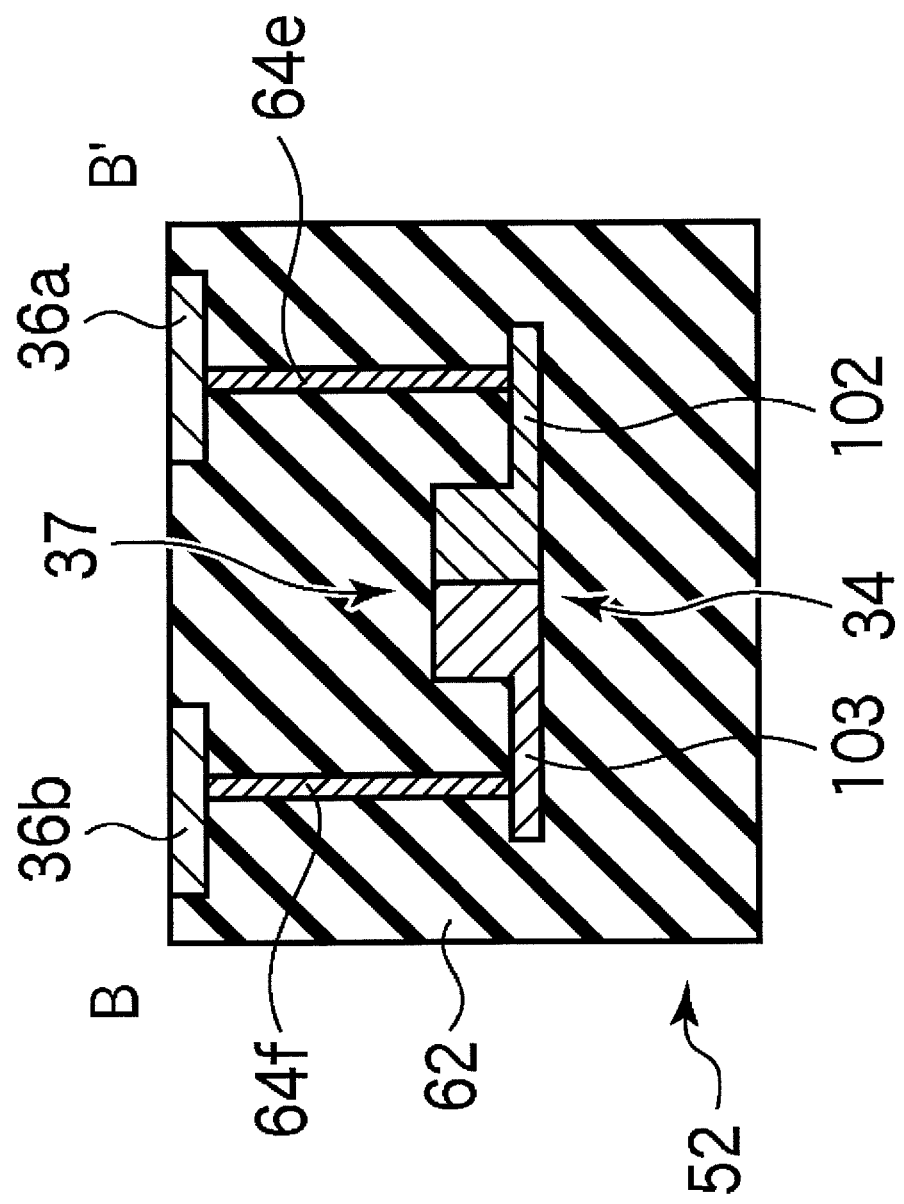
FIG. 26 is a second cross-sectional view illustrating the structure of the optical semiconductor element according to the fourth embodiment.
Figure 27:
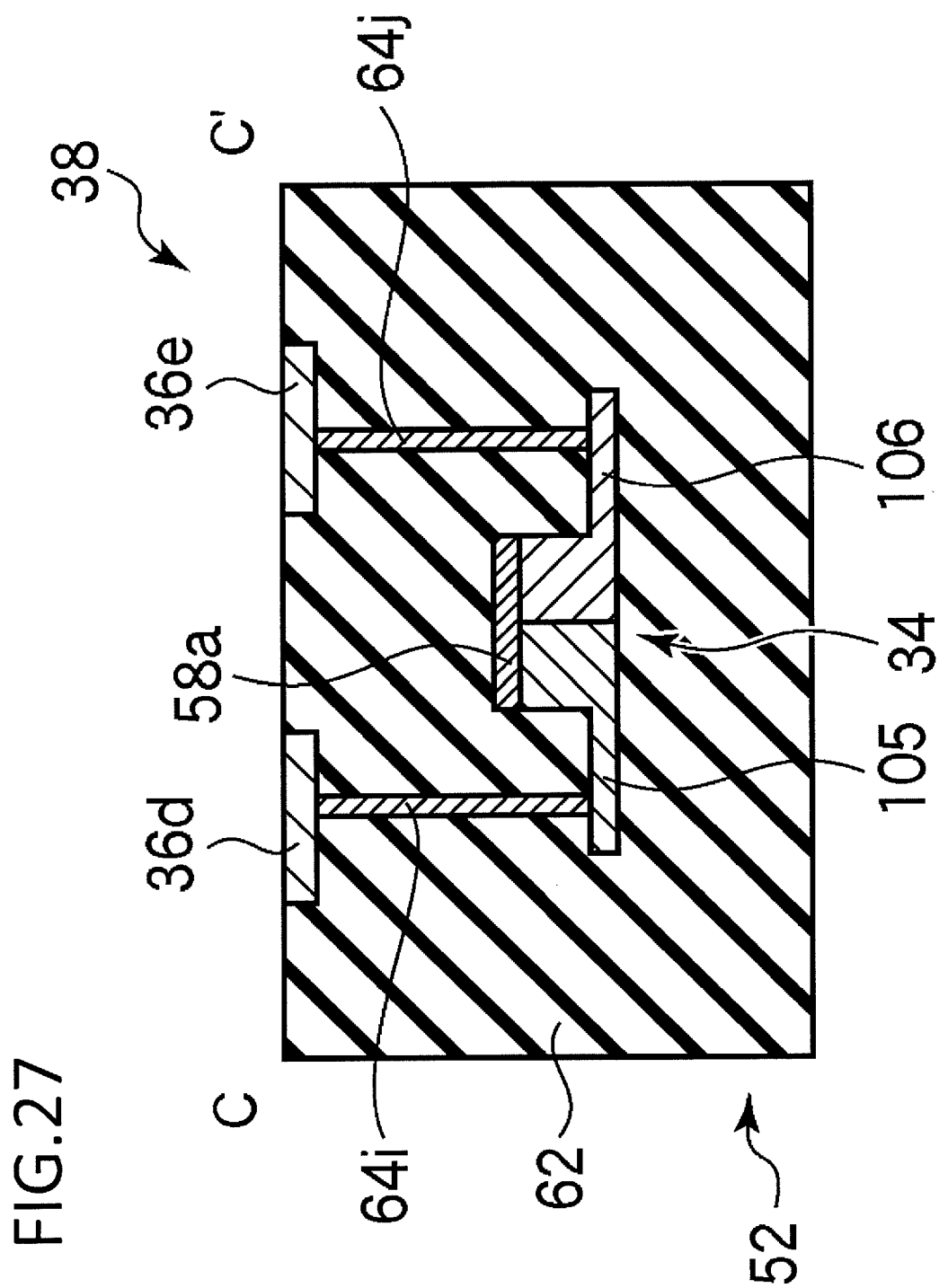
FIG. 27 is a third cross-sectional view illustrating the structure of the optical semiconductor element according to the fourth embodiment.

FIG. 24 is a schematic diagram illustrating the structure of an optical semiconductor element according to this embodiment. FIG. 25 is a cross-sectional view of the optical semiconductor element taken along the line A-A' of FIG. 24. FIG. 26 is a cross-sectional view of the optical semiconductor element taken along the line B-B' of FIG. 24. FIG. 27 is a cross-sectional view of the optical semiconductor element taken along the line C-C' of FIG. 24.

As illustrated in FIG. 24, in an optical semiconductor element according to this embodiment, the optical detection unit 38 is not disposed in the ring waveguide 34 and is disposed outside the ring waveguide 34.

Light lead to the ring waveguide 34 is detected by the optical detection unit 38 disposed outside the ring waveguide 34 via a waveguide that is optically coupled to the ring waveguide 34. Electrodes 36d and 36c for detecting the photocurrent $I_p$ are connected to the optical detection unit 38. The electrode 36d for the optical detection unit 38 is connected to the $V_{dd}$ line 32 via the resistor 24, and is further connected to the input terminal of the control unit 28. The electrode 36e is connected to the ground line.

The ring waveguide 34 and the waveguide have the structures illustrated in, for example, FIGS. 25 and 26. For example, the waveguide 104 is formed by patterning an SOI layer 54 in a mesa.

As illustrated in, for example, FIG. 27, the optical detection unit 38 includes an n-type layer 105 and a p-type layer 106, which are made of a material similar to that for the ring waveguide 34, and the SiGe light absorption layer 58a epitaxially grown on the n-type layer 105 and the p-type layer 106.

The electrodes 36d and 36e formed on the silicon oxide layer 62 are connected to the n-type layer 105 and the p-type layer 106 via VIA lines 64i and 64j, respectively. The electrodes 36d and 36e are made of, for example, copper. The VIA lines 64i and 64j are made of, for example, tungsten.

Thus, the optical detection unit 38 may be disposed outside the ring waveguide 34, and the photocurrent $I_p$ may be detected by the optical detection unit 38.

Fifth Embodiment

An optical semiconductor element according to the fifth embodiment will be described with reference to FIGS. 28 to 30. The same reference numerals are used to identify parts in optical semiconductor elements according to the first to fourth embodiments already described with reference to FIGS. 1 to 27, and the description thereof will be therefore omitted or simplified.

Figure 28:
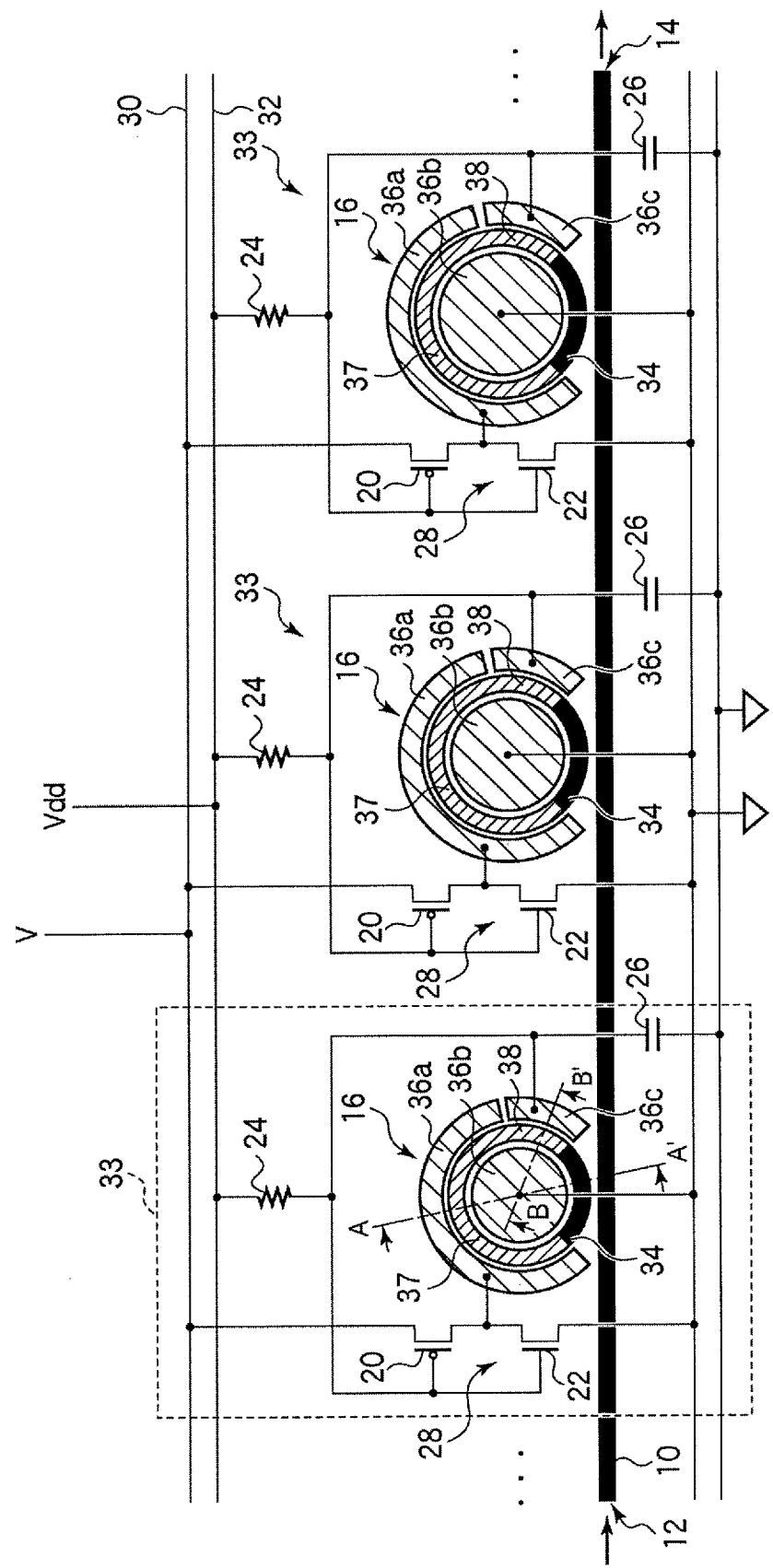
FIG. 28 is a schematic diagram illustrating the structure of an optical semiconductor element according to a fifth embodiment.

FIG. 28 is a schematic diagram illustrating the structure of an optical semiconductor element according to this embodiment. FIG. 29 is a cross-sectional view of the optical semiconductor element taken along the line A-A' of FIG. 28. FIG. 30 is a cross-sectional view of the optical semiconductor element taken along the line B-B' of FIG. 28.

As illustrated in FIG. 28, an optical semiconductor element according to this embodiment is the same as an optical semiconductor element according to the first embodiment except the structures of the optical modulation unit 37 and the optical detection unit 38.

Figure 29:
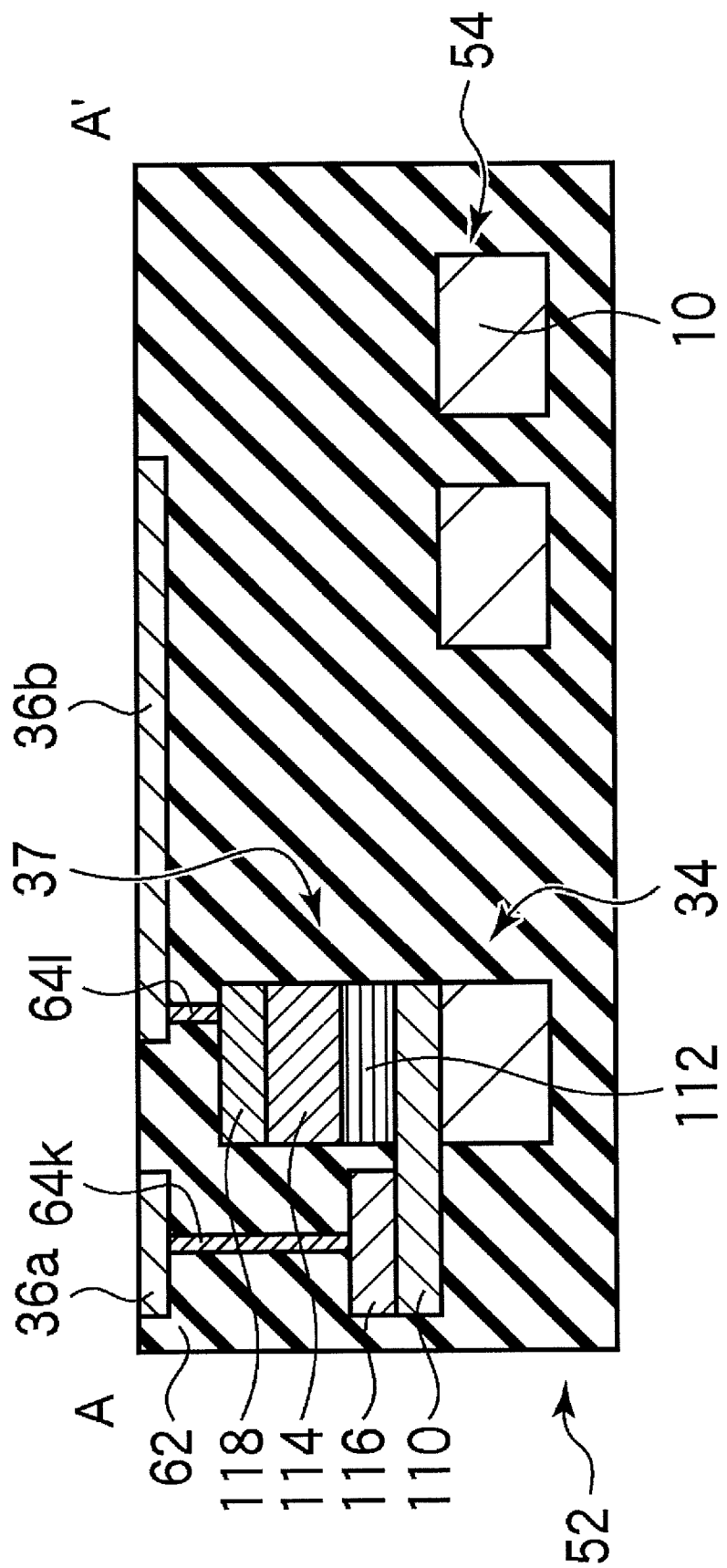
FIG. 29 is a first cross-sectional view illustrating the structure of the optical semiconductor element according to the fifth embodiment.

As illustrated in FIG. 29, the optical modulation unit 37 is formed with an n-type InP layer 110 formed on the ring waveguide 34, a multi quantum well layer 112 and a metal layer 116 formed on the n-type InP layer 110, a p-type InP layer 114 formed on the multi quantum well layer 112, and a metal layer 118 formed on the p-type InP layer 114.

Figure 30:
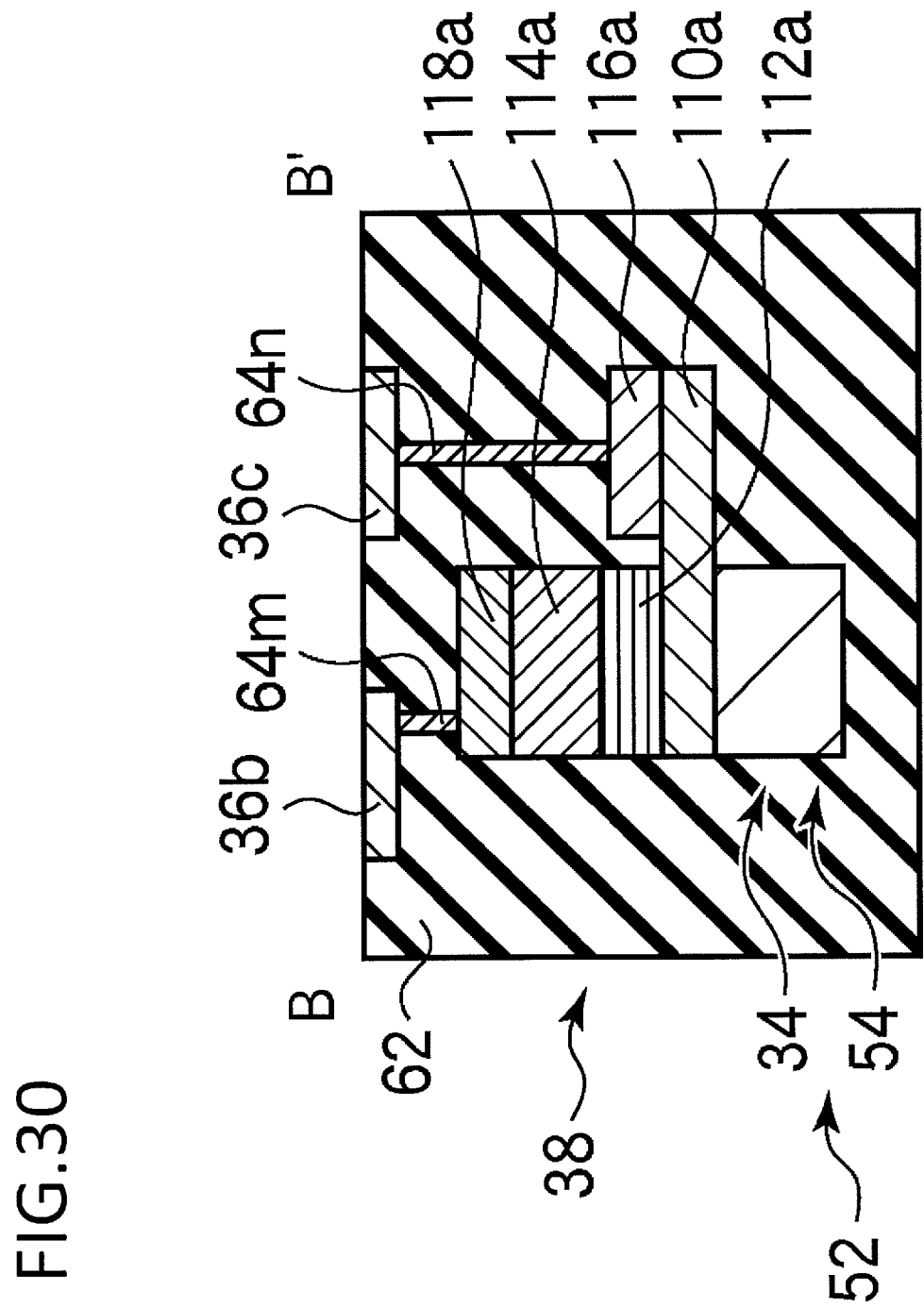
FIG. 30 is a second cross-sectional view illustrating the structure of the optical semiconductor element according to the fifth embodiment.

As illustrated in FIG. 30, the optical detection unit 38 is formed with an n-type InP layer 110a formed on the ring waveguide 34, a multi quantum well layer 112a and a metal layer 116a formed on the n-type InP layer 110a, a p-type InP layer 114a formed on the multi quantum well layer 112a, and a metal layer 118a formed on the p-type InP layer 114a.

The electrodes 36a formed on the silicon oxide layer 62 is connected to the metal layer 116 via a VIA line 64k. The electrode 36b formed on the silicon oxide layer 62 is connected to the metal layers 118 and 118a via VIA lines 64l and 64m, respectively. The electrode 36c formed on the silicon oxide layer 62 is connected to the metal layer 116a via a VIA line 64n.

Thus, each of the optical modulation unit 37 and the optical detection unit 38 may be formed with a multi quantum well.

Sixth Embodiment

An optical semiconductor element according to the sixth embodiment will be described with reference to FIG. 31. The same reference numerals are used to identify parts in optical semiconductor elements according to the first to fifth embodiments already described with reference to FIGS. 1 to 30, and the description thereof will be therefore omitted or simplified.

Figure 31:
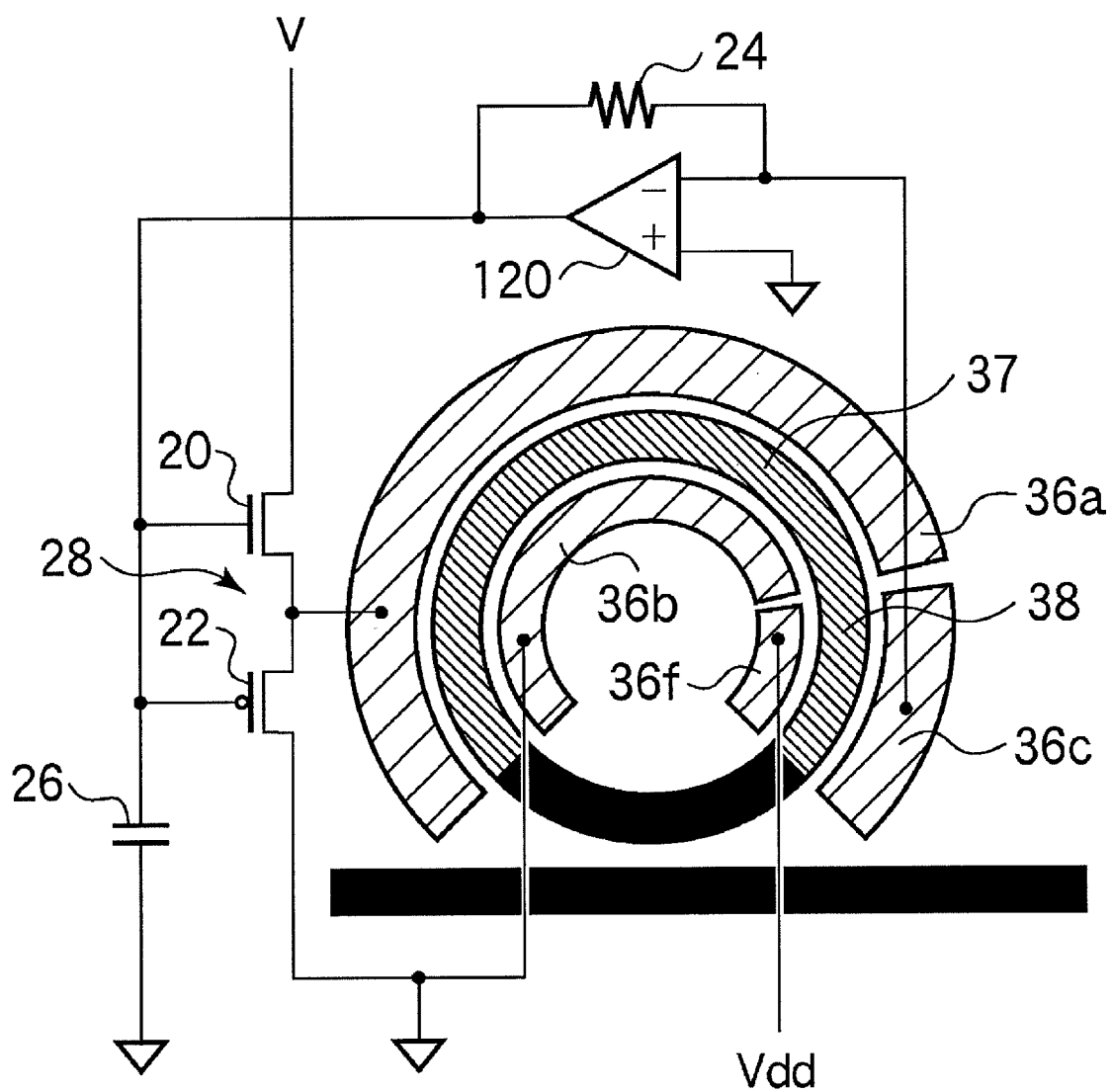
FIG. 31 is a schematic diagram illustrating the structure of an optical semiconductor element according to a sixth embodiment.

FIG. 31 is a schematic diagram illustrating the structure of an optical semiconductor element according to this embodiment.

As illustrated in FIG. 31, an optical semiconductor element according to this embodiment is the same as an optical semiconductor element according to the first embodiment except that an operational amplifier 120 is further disposed between the input terminal of the control unit 28 and the electrode 36c.

A non-inverting input terminal of the operational amplifier 120 is connected to the ground line. An inverting input terminal of the operational amplifier 120 is connected to the electrode 36c. An output terminal of the operational amplifier 120 is connected to the input terminals of the p-type depletion transistor 20 and the n-type enhancement transistor 22. The resistor 24 is connected to the negative terminal and output terminal of the operational amplifier 120. The voltage $V_{dd}$ is applied to an electrode 36f.

The operational amplifier 120 may convert the photocurrent $I_p$ detected by the optical detection unit 38 into the voltage $V_m$ and input the voltage $V_m$ into the control unit 28.

Modifications

The present disclosure is not limited to the above-described embodiments, and various changes may be made.

For example, in the above-described embodiments, a plurality of circular ring modulators having different diameters are disposed. However, these modulators may have another shape under the condition that they have different round-trip optical path lengths. For example, polygon ring modulators whose corner portions are arc shaped may be used.

In the above-described embodiments, the control unit 28 is formed with a circuit including the p-type depletion transistor 20 and the n-type enhancement transistor 22. However, another circuit, with which a modulation signal is applied to the optical modulation unit 37 when the output of the optical detection unit 38 is at a high level and no modulation signal is applied to the optical modulation unit 37 when the output of the optical modulation unit 37 is at a low level, may be used to form the control unit 28.

In the above-described embodiments, the ring waveguide 34 is made of silicon, but may be made of another material.

In the fourth embodiment, the optical detection unit 38 included in an optical semiconductor element according to the third embodiment is disposed outside the ring waveguide 34. However, the optical detection unit 38 included in an optical semiconductor element according to another embodiment may be disposed outside the ring waveguide 34.

In the fifth embodiment, a multi quantum well is used to form each of the optical modulation unit 37 and the optical detection unit 38. However, any of bulk, quantum-wire, quantum dot may be used to form each of the optical modulation unit 37 and the optical detection unit 38.

The operational amplifier 120 included in an optical semiconductor element according to the sixth embodiment may be used in optical semiconductor elements according to the first to fifth embodiments.

The structures, structural parameters, and materials of optical semiconductor elements, which have been described in the above-described embodiments, are illustrative examples only, and various modifications and changes may be made with technical knowledge of those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical semiconductor element comprising:
a waveguide into which input light is input;
a plurality of ring modulators that have different optical perimeter lengths and are optically coupled to the waveguide; and
a plurality of control units, each connected between each ring modulator and
a modulation signal input terminal, each configured to selectively apply the modulation signal to the corresponding ring modulators having a resonant wavelength that is the same as a wavelength of the input light.

2. An optical semiconductor element comprising:
a waveguide into which input light is input;
a modulation signal input terminal, and
a plurality of modulation units each including,
a ring modulator that is optically coupled to the waveguide,
an optical detector configured to monitor optical power in the ring modulator, and
a control unit that is connected to the ring modulator, the modulation signal input terminal and the optical detector, and is configured to apply a modulation signal to the ring modulator on the basis of a signal detected by the optical detector, and
wherein the ring modulators included in the plurality of modulation units have different optical perimeter lengths.

3. The optical semiconductor element according to claim 2, wherein the control unit applies weight to the modulation signal to be applied to the ring modulator on the basis of a value of the signal detected by the optical detector.

4. The optical semiconductor element according to claim 2, wherein the control unit changes an impedance between the modulation signal input terminal and the ring modulator on the basis of a value of the signal detected by the optical detector.

5. The optical semiconductor element according to claim 2, wherein the control unit applies the modulation signal to the ring modulator when a wavelength of the input light and a resonant wavelength of the ring modulator match.

6. The optical semiconductor element according to claim 5, wherein the control unit determines that the wavelength of the input light and the resonant wavelength of the ring modulator match when the value of the signal detected by the optical detector is the maximum.

* * * * *